United States Patent [19]

Murata et al.

[11] 3,824,384

[45] July 16, 1974

[54] FREQUENCY ANALYZER FOR ANALYZING A TIME FUNCTION OF A QUANTITY

[75] Inventors: Yutaka Murata; Sigeru Izumi, both of Tokyo, Japan

[73] Assignees: Hitachi, Ltd.; Murata Yutaka, both of Tokyo, Japan

[22] Filed: Mar. 9, 1972

[21] Appl. No.: 233,029

[30] Foreign Application Priority Data

Sept. 9, 1971 Japan .............................. 46-69925
Apr. 19, 1971 Japan .............................. 46-24488

[52] U.S. Cl. .............................................. 235/156
[51] Int. Cl. ............................................ G06f 15/34
[58] Field of Search ........... 235/156, 181; 324/77 D

[56] References Cited

UNITED STATES PATENTS

| | | | |
|---|---|---|---|
| 3,586,843 | 6/1971 | Sloane | 235/156 |
| 3,636,333 | 1/1972 | Klund | 235/156 |
| 3,686,490 | 8/1972 | Goldstone | 235/156 |

*Primary Examiner*—Felix D. Gruber
*Assistant Examiner*—David H. Malzahn
*Attorney, Agent, or Firm*—Craig & Antonelli

[57] ABSTRACT

A frequency analyzer comprising a pre-processor, gates, adder-subtracters, a function generator, multipliers and a grand adder. An analog signal representative of a function of time $f(t)$ of a quantity to be analyzed is applied to the pre-processor, thence through the gates to the adder-subtracters. The function generator generates a trigonometric function which is applied to the multipliers to be multiplied by the outputs of the adder-subtracters, and the outputs of the multipliers are applied to the grand adder.

5 Claims, 21 Drawing Figures

FREQUENCY ANALYZER FOR ANALYZING A TIME FUNCTION OF A QUANTITY

BACKGROUND OF THE INVENTION

1. Field of the Invention

This invention relates to a novel frequency analyzer and more particularly to a frequency analyzer in which the period of time of data input application is suitably meshed so that it is a function of a frequency to be analyzed.

2. Description of the Prior Art

Various methods of frequency analysis have been proposed in recent years in various technical fields for the purpose of, for example, analysis of noises occurring in nuclear reactors and analysis of frequencies in acoustics. Digital Fourier transformation (hereinafter to be abbreviated as DFT) by means of digital processing of data is especially most frequently employed among these methods. DFT comprises previously preparing a sine wave and a cosine wave at every frequency point, determining suitably the sampling period and measuring time depending on the frequency range to be subject to analysis, applying a time function of a quantity to be analyzed from an A-D converter as a data input to a data processor such as a digital computer, and after the application of the data input, processing the data input in relation to the sine and cosine waves previously prepared at every frequency point according to the Fourier transformation. This method, however, is defective in that multiplication is required a multiplicity of times and an elongated processing period of time is required.

Fast Fourier transformation (hereinafter to be abbreviated as FFT) has been proposed in an effort to improve the DFT. However, this FFT is also defective in many points as described below.

1. Analysis cannot be started until after all the data have been applied. Therefore, there is a wasteful idle time between the sampling periods.
2. The amount of data increases when a wide frequency range is to be analyzed, resulting in an increase in the region occupied by the data in a memory which stores such data.
3. The memory region for storing the table of trigonometric functions increases in proportion to the amount of data.
4. Resolution is primarily determined by the period of time of input data application and is fixed and unvariable throughout the frequency points.
5. The calculated frequency points are primarily determined by the sampling period and by the number of sampling. As a result, the number of frequency points appearing in a high-frequency range is unnecessarily large, while the number of frequency points appearing in a low-frequency range is less than required.

SUMMARY OF THE INVENTION

It is therefore an object of the present invention to provide an improved frequency analyzer for analyzing as a function of time a quantity to be analyzed wherein such disadvantages as discussed above in connection with the prior art is eliminated.

It is another object of the present invention to provide a frequency analyzer by which the power spectrum density of a quantity to be analyzed such as noises occurring in nuclear reactors and the like can be obtained in real time.

A frequency analyzer according to the present invention is characterized, to perform the above objects, by being composed in the manner so that a quantity to be analyzed is sampled to obtain the total sum $lS_k$ or $l$ sampled values and then the power spectrum density at a frequency point of angular frequency $2\pi/Nl\tau$ by obtaining the sum of the respective multiplication obtainable by multiplying $N$ words of $lS_k$ by trigonometrical function values.

DESCRIPTION OF THE PREFRRED EMBODIMENTS

Figure 1:
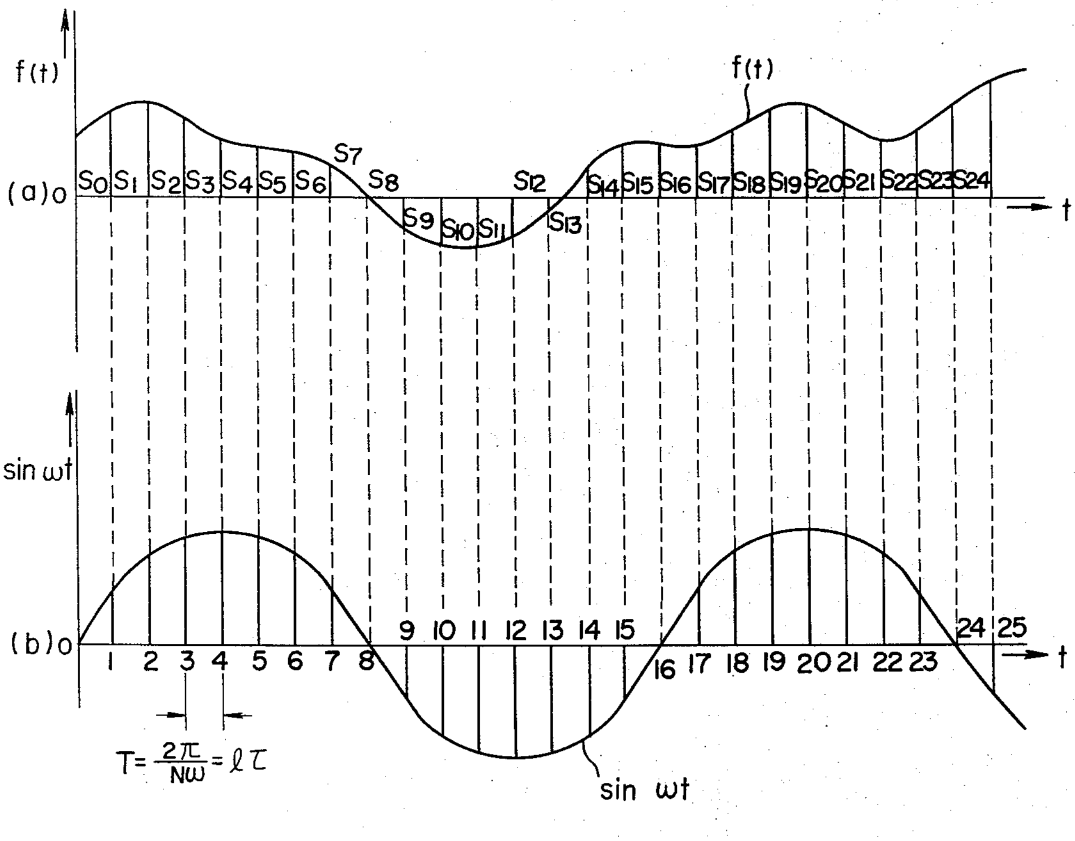
FIGS. 1, 2 and 3 are diagrammatic illustrations of the relationship between the respective signals cited for explaining the basic principle of the operation according to the present invention.

In digital frequency analysis, it is fundamental that a time function $f(t)$ of a quantity to be analyzed be multiplied by trigonometric functions (a sine wave signal $\sin \omega_0 t$ and a cosine wave signal $\cos \omega_0 t$, where $\omega_0$ is an angular frequency to be analyzed) so as to calculate the following function (1):

$$\left.\begin{aligned} X_s &= \frac{1}{l}\sum_{i=0}^{i=l-1} f_i \sin(\omega_0 \cdot \tau \cdot i) \\ X_c &= \frac{1}{l}\sum_{i=0}^{i=l-1} f_i \cos(\omega_0 \cdot \tau \cdot i) \end{aligned}\right\} \quad (1)$$

where $f_i$ is the $i$th function value obtained by the digital transformtion of the time function $f(t)$ with a sampling period $\tau$, and $l$ is the total number of sampling determined depending on the resolution and frequency range. Therefore, the period of time $T$ of input data application is given by $$T = \tau \cdot l \qquad (1\text{-}1)$$

Now, $f_i$ is suitably integrated by the following equation (1-2) to obtain ${}_lS_k$:

$${}_lS_k = \frac{\sum_{i=-\infty}^{\infty} h(k,l,i) f_i}{\sum_{i=-\infty}^{\infty} h(k,l,i)} \qquad (1\text{-}2)$$

$$(k = 0, 1, 2, 3, \ldots)$$

In the equation (1-2), $h(k,l,i)$ is a function which has a finite value within a specific range only of $i$ and is zero in any other ranges, and $l$ is a positive integer. ${}_lS_k$ represents a value obtained by suitably weighting $f_i$ with $h(k,l,i)$ and then taking the sum within the specific range of $i$. The function $h(k,l,i)$ may, for example, be $$h(k,l,i) = \begin{cases} 1 \ldots lk \leqq i \leqq l(k+1)-1 \\ 0 \ldots i < lk,\ i \geqq l(k+1) \end{cases} \qquad (1\text{-}3)$$

$$(k = 0, 1, 2, 3 \ldots)$$

In this case, ${}_lS_k$ is expressed as $${}_lS_k = \frac{1}{l} \sum_{i=kl}^{l(k+1)-1} f_i \qquad (2)$$

${}_lS_k$ given by the equation (2) represents a value which is the arithmetic mean of $l$ successive values of $f_i$ and is orderly numbered by $k$. It will thus be seen that, while $f_i$ represents data taken at intervals of $\tau$, ${}_lS_k$ represents data of $f_i$ taken at intervals of $l\tau$ according to the equation (1-2). Suppose that the period of time $l\tau$ is represented by $T$, then $$T = l\tau \qquad (3)$$

Suppose now that a positive value $N$ is employed which will give $2\pi/\omega$ when $T$ in the equation (3) is multiplied by $N$ and that $\omega$ is the angular frequency determined by the employment of such a value $N$, then $\omega$ is given by $$\omega = 2\pi/Nl\tau = 2\pi/N \cdot 1/T \qquad (4)$$

Suppose further that $T_0$ is the angle relative to the period of time $T$ and angular frequency $\omega$, then $T_0$ is given by $$T_0 = \omega T = 2\pi/N \qquad (5)$$

Therefore, the equation (1) can be approximated on the basis of the relations (2) to (5) as follows:

$$X_s \doteqdot \frac{1}{Nn} \sum_{k=0}^{Nn-1} {}_lS_k \sin T_0 \cdot k$$

$$X_c \doteqdot \frac{1}{Nn} \sum_{k=0}^{Nn-1} {}_lS_k \cos T_0 \cdot k \qquad (6)$$

In the equation (6), $N$ represents the number of meshes in one period of the angular frequency $\omega$ under consideration, and $n$ represents the wave number of the angular frequency $\omega$. Thus, when $n = 2$, for example, this means that the operation of the equation (6) is carried out over two periods (0 to $4\pi$).

Figure 2:
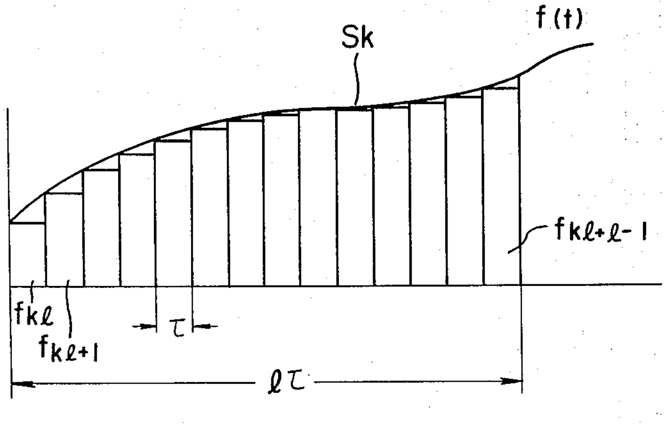

FIG. 1 shows the relation between signal waveforms when $N$ is selected to be $N = 16$. In the portion ($a$) of FIG. 1, a function of time $f(t)$ of a quantity to be analyzed is divided into a plurality of sections at intervals of $l\tau$. In each section, the total sum ${}_lS_k$ of $l$ function values $f_{kl}, f_{kl+1}, \ldots f_{kl+l-1}$ of the time function $f(t)$ is obtained as seen in FIG. 2. Portion ($b$) of FIG. 1 shows the waveform of a sine wave signal $\sin \omega t$ in which $\omega$ is the angular frequency determined by the equation (4). In portion ($b$) of FIG. 1, the numerals 0, 1, 2, . . . represent the values of $k$. Therefore, the equation (6) means the fact that the total sum ${}_lS_k$ of the $l$ function values is multiplied by the $k$th sine wave signal value or $\sin T_0 \cdot k$ and $k$ is varied successively as 0, 1, 2, . . . for obtaining the total sum of the values of ${}_lS_k$. It is seen from the equation (4) that the angular frequency $\omega$ is a function of $N$ and $l$. When therefore $N$ is fixed, the angular frequency $\omega$ is a function of $l$ only. Thus, a variety of frequencies can be analyzed by suitably varying the value of $l$. The same applies to the cosine wave signal and any detailed description is unnecessary.

Figure 3:
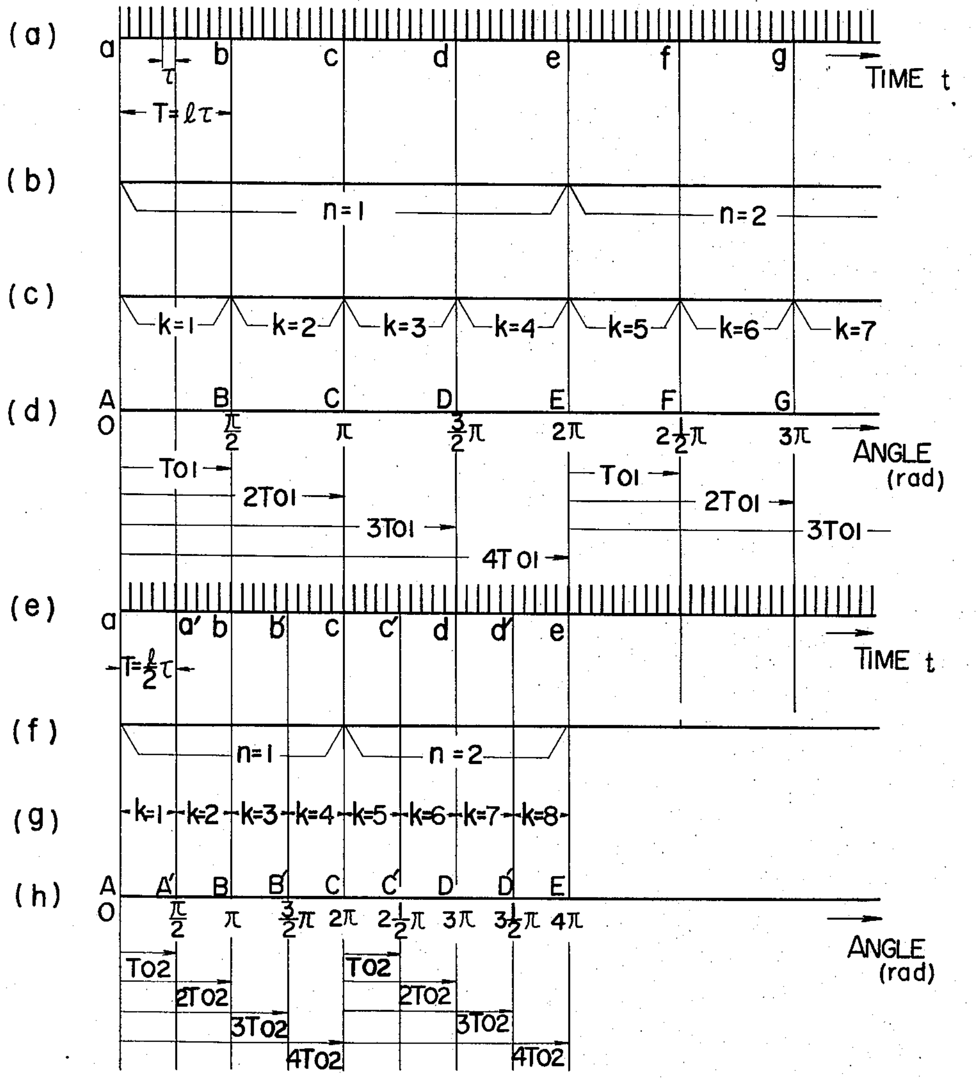

The relation above described is shown in detail in FIG. 3, but for the simplicity of explanation, $N$ is selected to be $N = 4$ in FIG. 3. The portions ($a$) to ($d$) of FIG. 3 represent the case corresponding to the angular frequency $\omega$, while portions ($e$) to ($h$) of FIG. 3 represent the case corresponding to the angular frequency $2\omega$. The portion of FIG. 3 illustrating the sampling interval, points $a, b, c, \ldots$ are division points for dividing data so that $l$ data are included in each divided section. The portion $b$ of FIG. 3 illustrates the wave number $n$ correspondonding to the angular frequency $\omega$, and the portion ($c$) of FIG. 3 illustrates the value of $k$ corresponding to each wave number $n$. Thus, when for example, $k = 2$, the total sum ${}_lS_2$ of $l$ data appearing between the points $b$ and $c$ can be obtained. The portion ($d$) of FIG. 3 illustrates the relation between the value of $k$ and the angular values of sine and cosine wave signals in which the angular frequency $\omega = 2\pi/4l\tau$, and $T_{01}$ is set at $\pi/2$. According to the illustration given in the portions ($a$) to ($d$) of FIG. 3, the equation (6) can be expressed as $$\left.\begin{aligned} X_s &= \frac{1}{Nn} [{}_lS_0 \cdot \sin T_{01} \cdot 0 + {}_lS_1 \cdot \sin T_{01} \cdot 1 \\ &\quad + {}_lS_2 \cdot \sin T_{01} \cdot 2 + , \ , \ ,] \\ X_c &= \frac{1}{Nn} [{}_lS_0 \cdot \cos T_{01} \cdot 0 + {}_lS_1 \cdot \cos T_{01} \cdot 1 \\ &\quad + {}_lS_2 \cdot \cos T_{01} \cdot 2 + . \ . \ .] \end{aligned}\right\} \qquad (7)$$

The portion ($e$) of FIG. 3 represents the case in which the $l$ data in the portion ($a$) of FIG. 3 are further divided into halves, that is, the case in which the angular frequency is $2\omega$. In this case, the values shown in the portions ($f$), ($g$), and ($h$) of FIG. 3 are one-half of the respective values shown in the portions ($b$), ($c$), and ($d$) of FIG. 3. It has been clarified from the above description that analysis of the desired angular frequency can be carried out by suitably selecting the value of $l$.

It is to be noted in this connection that the value of $T_0$ remains unchanged even when the angular frequency $\omega$ is varied variously depending on the value of $l$ as shown in the equation (5). This fact bears an important significance for the present invention. More precisely, due to the fact that the value of $T_0$ is primarily determined independently of the frequency when $N$ is fixed, $X_s$ in the equation (6) may be sought by previously preparing sin $T_0 \cdot 0$, sin $T_0 \cdot 1$, sin $T_0 \cdot 2$, . . . determined by the value of $N$, successively multiplying these values by the value of ${}_lS_k$ determined by the value of $l$, and taking the total sum of the values obtained by the multiplication. (Since the same applies to $X_c$, no description will be given herein.)

On the other hand, due to the fact that both the sine wave and the cosine wave are periodic functions, it is unnecessary to seek the value of sin $T_0 \cdot k$ ($k = 0, 1, 2, \ldots$) depending on the wave number $n$. Description will now be given with regard to the case in which $N = 16$ and $T_0 = 22.5°$, this $T_0$ being obtained by equally dividing $2\pi$ by 16, hence equally dividing $\pi/2$ by 4. Suppose now that $$\left.\begin{aligned} &\sin 0 \cdot T_0 = S(0), \quad \sin 1 \cdot T_0 = S(1), \\ &\sin 2 \cdot T_0 = S(2), \quad \sin 3 \cdot T_0 = S(3), \\ &\sin 4 \cdot T_0 = S(4) \end{aligned}\right\} \quad (8)$$

and that $m$ is an integer, then the following equations hold:

$$\left.\begin{aligned}
\sin 16m\, T_0 &= \sin (16m+8)\, T_0 = S(0) \\
\sin (16m+1)\, T_0 &= \sin (16m+7)\, T_0 \\
&= -\sin (16m+9)\, T_0 \\
&= -\sin (16m+15)\, T_0 = S(1) \\
\sin (16m+2)\, T_0 &= \sin (16m+6)\, T_0 \\
&= -\sin (16m+10)\, T_0 \\
&= -\sin (16m+14)\, T_0 = S(2) \\
\sin (16m+3)\, T_0 &= \sin (16m+5)\, T_0 \\
&= -\sin (16m+11)\, T_0 \\
&= -\sin (16m+13)\, T_0 = S(3) \\
\sin (16m+4)\, T_0 &= -\sin (16m+12)\, T_0 = S(4)
\end{aligned}\right\} \quad (9)$$

$$\left.\begin{aligned}
\cos 16m\, T_0 &= -\cos (16m+8)\, T_0 = S(4) \\
\cos (16m+1)\, T_0 &= -\cos (16\, m+7)\, T_0 \\
&= -\cos (16m+9)\, T_0 \\
&= \cos (16m+15)\, T_0 = S(3) \\
\cos (16m+2)\, T_0 &= -\cos (16m+6)\, T_0 \\
&= -\cos (16m+10)\, T_0 \\
&= \cos (16m+14)\, T_0 = S(2) \\
\cos (16m+3)\, T_0 &= -\cos (16m+5)\, T_0 \\
&= -\cos (16m+11)\, T_0 \\
&= \cos (16m+13)\, T_0 = S(1) \\
\cos (16m+4)\, T_0 &= -\cos (16m+12)\, T_0 = S(0)
\end{aligned}\right\} \quad (10)$$

Therefore, the equation (6) in the case of $N = 16$ can be transformed as follows:

$$X_s = \sum_{k=0}^{16n-1} S_k \sin kT_0$$

$$\begin{aligned}
&= S(0)[\{(S_0 - S_8)\} + \{(S_{16} - S_{24})\} + \ldots \\
&\quad + \{(S_{16(n-1)} - S_{16(n-1)+8})\}] \\
&\quad + S(1)[\{(S_1 - S_9) + (S_7 - S_{15})\} \\
&\quad + \{(S_{17} - S_{25}) + (S_{23} - S_{31})\} + \ldots \\
&\quad + \{(S_{16(n-1)+1} - S_{16(n-1)+9}) \\
&\quad + (S_{16(n-1)+7} - S_{16(n-1)+15})\}] \\
&\quad + S(2)[\{(S_2 - S_{10}) + (S_6 - S_{14})\} \\
&\quad + \{(S_{18} - S_{26}) + (S_{22} - S_{30})\} + \ldots \\
&\quad + \{(S_{16(n-1)+2} - S_{16(n-1)+10}) \\
&\quad + (S_{16(n-1)-6} - S_{16(n-1)+14})\}] \\
&\quad + S(3)[\{(S_3 - S_{11}) + (S_5 - S_{13})\} \\
&\quad + \{(S_{19} - S_{27}) + (S_{21} - S_{29})\} + \ldots \\
&\quad + \{(S_{16(n-1)+3} - S_{16(n-1)+11}) \\
&\quad + (S_{16(n-1)+5} - S_{16(n-1)+13})\}] \\
&\quad + S(4)[\{(S_4 - S_{12}) + (S_{20} - S_{28})\} + \ldots
\end{aligned}$$

$$+ \{(S_{16(n-1)+4} - S_{16(n-1)+12})\}]$$

$$X_c = \sum_{k=0}^{16n-1} S_k \cos kT_0$$

$$\begin{aligned}
&= S(4)[\{(S_0 - S_8)\} + \{(S_{16} - S_{24})\} + \ldots \\
&\quad + \{(S_{16(n-1)} - S_{16(n-1)+8})\}] \\
&\quad + S(3)[\{(S_1 - S_9) - (S_7 - S_{15})\} \\
&\quad + \{(S_{17} - S_{25}) - (S_{23} - S_{31})\} + \ldots \\
&\quad + \{(S_{16(n-1)+1} - S_{16(n-1)+9}) \\
&- (S_{16(n-1)+7} - S_{16(n-1)+15})\}] \\
&\quad + S(2)[\{(S_2 - S_{10}) - (S_6 - S_{14})\} \\
&\quad + \{(S_{18} - S_{26}) + (S_{22} - S_{30})\} + \ldots \\
&\quad + \{(S_{16(n-1)+2} - S_{16(n-1)+10}) \\
&\quad - (S_{16(n-1)+6} - S_{16(n-1)+14})\}] \\
&\quad + S(1)[\{(S_3 - S_{11}) - (S_5 - S_{13})\} \\
&\quad + \{(S_{19} - S_{27}) - (S_{21} - S_{29})\} + \ldots \\
&\quad + \{(S_{16(n-1)+3} - S_{16(n-1)+11}) \\
&\quad - (S_{16(n-1)+5} - S_{16(n-1)+13})\}] \\
&\quad + S(0)[\{(S_4 - S_{12})\} + \{(S_{20} - S_{28})\} + \ldots \\
&\quad + \{(S_{16(n-1)+4} - S_{16(n-1)+12})\}]
\end{aligned}$$

The equations (11) and (12) indicate the fact that $X_s$ and $X_c$ can be sought by simple addition, subtraction and multiplication when the five trigonometric function values $S(0)$, $S(1)$, $S(2)$, $S(3)$ and $S(5)$ are merely prepared.

There are some practical methods for seeking $X_s$ and $X_c$ from the equations (11) and (12). A most primitive method for seeking $X_s$ and $X_c$ from the equations (11) and (12) comprises previously preparing trigonometric function values within the range of 0° to 90°, discriminating as to which trigonometric function value is related with input data each time such data are applied, producing a partial term by multiplying the data by the trigonometric function on the basis of the result of discrimination, and successively carrying out addition or subtraction on these partial terms. While this method is defective in that it requires a considerable number of processing means, this method is effective when the number of data is small. Another method which is advanced compared with the afore-mentioned method comprises preparing trigonometric function values separately from their coefficients, operating the coefficients independently of the trigonometric function values, and multiplying the trigonometric function values by the coefficients at suitable intervals. In this method, signal distributing means capable of grouping input data in a form conforming to the trigonometric function values are employed so as to seek the coefficients for the trigonometric function values. Then, upon computation of the coefficients, the trigonometric function values are multiplied by the coefficients. The manner of realizing this method includes several modes depending on the period in which data are arranged for processing. The first mode is based on the thought in which one period is $\pi/2$, and this is a most faithful method for the computation of the equations (11) and (12). More precisely, as shown in Table 1, the coefficients are subject to addition and subtraction supposing that the period is repeated at the rate of $\pi/2$, so that they correspond to the trigonometric function values within the range of 0 to $\pi/2$.

TABLE 1

| Sine wave function values | Coefficients |
|---|---|
| $S(0)$ | $S_0-S_8+S_{16}-S_{24}+\ldots+S_{16(n-1)}-S_{16(n-1)+8}$ |
| $S(1)$ | $S_1-S_9+S_7-S_{15}+S_{17}-S_{25}+S_{35}-S_{31}+\ldots$<br>$+S_{16(n-1)+1}-S_{16(n-1)+9}+S_{16(n-1)+7}-S_{16(n-1)+15}$ |
| $S(2)$ | $S_2-S_{10}+S_6-S_{14}+S_{18}-S_{26}+S_{22}-S_{30}+\ldots$<br>$+S_{16(n-1)+2}-S_{16(n-1)+10}+S_{16(n-1)+6}-S_{16(n-1)+14}$ |
| $S(3)$ | $S_3-S_{11}+S_5-S_{13}+S_{19}-S_{27}+S_{21}-S_{29}+\ldots$<br>$+S_{16(n-1)+3}-S_{16(n-1)+11}+S_{16(n-1)+5}-S_{16(n-1)+13}$ |
| $S(4)$ | $S_4-S_{12}+S_{20}-S_{28}+\ldots+S_{16(n-1)+4}-S_{16(n-1)+12}$ |

An embodiment shown in FIGS. 11 to 14 is adapted to carry out such operation.

The second mode is based on the thought in which one period is $\pi$. In this method, the equations (11) and (12) are suitably modified. Table 2 shows the relation between the coefficients and the trigonometric function values in this case.

TABLE 2

| Sine wave function values | Coefficients |
|---|---|
| $S(0)$ | $S_0-S_8+S_{16}-S_{24}+\ldots+S_{16(n-1)}-S_{16(n-1)+8}$ |
| $S(1)$ | $S_1-S_9+S_{17}-S_{25}+\ldots+S_{16(n-1)+1}-S_{16(n-1)+9}$ |
| $S(2)$ | $S_2-S_{10}+S_{18}-S_{26}+\ldots+S_{16(n-1)+2}-S_{16(n-1)+10}$ |
| $S(3)$ | $S_3-S_{11}+S_{19}-S_{27}+\ldots+S_{16(n-1)+3}-S_{16(n-1)+11}$ |
| $S(4)$ | $S_4-S_{12}+S_{20}-S_{28}+\ldots+S_{16(n-1)+4}-S_{16(n-1)+12}$ |
| $S(5)$ | $S_5-S_{13}+S_{21}-S_{29}+\ldots+S_{16(n-1)+5}-S_{16(n-1)+3}$ |
| $S(6)$ | $S_6-S_{14}+S_{22}-S_{30}+\ldots+S_{16(n-1)+6}-S_{16(n-1)+14}$ |
| $S(7)$ | $S_7-S_{15}+S_{23}-S_{31}+\ldots+S_{16(n-1)+7}-S_{16(n-1)+5}$ |

Means for carrying out this second method are simplified compared with the first method. As described hereinabove, both $X_s$ and $X_c$ must be sought in order to carry out frequency analysis according to the Fourier transformation.

Suppose now that data are classified as shown in Table 2, $X_s$ and $X_c$ in the equations (11) and (12) are given by $$X_s = [0]\times S(0) + \{[1]+[7]\}\times S(1) + \{[2]+[6]\}\times S(2) + \{[3]+[5]\}\times S(3) + [4]\times S(4) \qquad (13)$$

$$X_c = [0]\times S(4) + \{[1]-[7]\}\times S(3) + \{[2]-[6]\}\times S(2) + \{[3]-[5]\}\times S(1) + [4]\times S(0) \qquad (14)$$

In the above equations, $[j]$ represents a coefficient at $S(j)$. It will be apparent from the equations (13) and (14), the classification of data in a manner as shown in Table 2 is advantageous in that $X_s$ and $X_c$ can be very easily sought by a simple operation which includes only the determination as to whether addition or subtraction should be carried out on the coefficients and which trigonometric function should be multiplied by the coefficients for these data. In the manner of classification of data as shown in Table 1, the operation is not so simple since the data are sought so that all of them correspond to the trigonometric function values $S(0)$ to $S(4)$. Embodiments shown in FIG. 15 and the succeeding drawing are based on this second method. In the later description however, it is assumed that any waves having a period shorter than $2\tau$ are not present. That is, the present invention is based on the assumption that input data are applied through a filter which removes any waves having a period shorter than $2\tau$ or through an A–D converter of the integrating type. This is also similarly required in the prior art DFT and FFT.

In the present invention, the number of meshes $N$ and the wave number $n$ are intimately related with the frequency resolution. Therefore, the selection of the values of $N$ and $n$ is an important problem.

The number of times of multiplication required for the computation of $X_s$ and $X_c$ is $N$–1/2 or less in each case. (Generally, $N$ may be a fraction such as $N = v/u$ where $v/u \geqq 2$. In such a case, the number of times of multiplication is $v/4 - 1$ when $v$ is a multiple of 4, $v/4 - 1/2$ when $v$ is not a multiple of 4 but a multiple of 2, and $v$–1/2 when $v$ is an odd number. In this case, the multiplication of $\sin 0 = 0$ and $\sin(\pi/2) - 1$ are not included.) Further, when data are sampled with a sampling period $\tau$, the highest frequency that can be analyzed is represented by a frequency value corresponding to $l = 1$. The frequency $\omega$ in this case is given by $$\omega = 2\pi/N\tau \qquad (15)$$

It is therefore necessary to investigate as to how $N$ and $n$ are related with the resolution and to minimize the value of $N$ within the range of required resolution. Consider now the computation of the power spectrum of an angular frequency $\omega$. Suppose that an input data given by the following equation is applied in this case:

$$f(t) = \sin(a\omega t + \phi) \qquad (16)$$

where $0 < a$.

We will now investigate the situation in which, when a single sine wave having an angular frequency $a\omega$ is applied, such a wave appears in what form in the power spectrum of the angular frequency $\omega$. Ideally, the power spectrum is 1 only when $a = 1$ and is 0 when $a \neq 1$. However, this does not apply to the case in which $N$ and $n$ are finite values. As a general rule, $\omega$ may well be considered to be $\omega = 1$ and we will proceed with the discussion hereinafter assuming that $\omega = 1$.

$$P(a, N, n, \varphi) = \frac{1}{n^2\pi^2}\left\{\left(\sum_{k=0}^{Nn-1} S_k \sin kT_0\right)^2 + \left(\sum_{k=0}^{Nn=1} S_k \cos kT_0\right)^2\right\} \qquad (17)$$

$$S_k = \frac{1}{T_0}\int_{T_0(k-1/2)}^{T_0(k+1/2)} \sin(at+\varphi)\,dt \qquad (18)$$

$$T_0 = 2\pi/N \tag{19}$$

From the above equations (17), (18) and (19), $P(a, N, n, \phi)$ is given by $$P(a,N,n,\varphi) = \frac{1}{a^2n^2\pi^2}\sin^2\left(\frac{\pi a}{N}\right) x(1-\cos 2n\pi a)\frac{1}{\sin\frac{\pi}{N}(a-1)\cdot\sin\frac{\pi}{N}(a+1)} x\left[\frac{\sin^2\frac{\pi}{N}(a-1)+\sin^2\frac{\pi}{N}(a+1)}{2\sin\frac{\pi}{N}(a+1)\cdot\sin\frac{\pi}{N}(a-1)} - \cos\left(2n\pi a + 2\varphi - \frac{2\pi a}{N}\right)\right] \tag{20}$$

In the condition $N \rightarrow \infty$, the equation (20) is expressed as $$P(a,n,\phi) = 1/[n^2\pi^2(a^2-1)^2] \times (1-\cos 2n\pi a) \times (a^2+1) - (a^2-1)\cos(2n\pi a + 2\phi) \tag{21}$$

When the mean of $\phi$ is taken, the term including $\phi$ in the euqation (20) is eliminated to provide the following equation:

$$P(a,N,n) = 1/a^2\pi^2n^2 (\sin \pi a/N)^2 (1-\cos 2n\pi a) x\frac{\left\{\sin\frac{\pi}{N}(a-1)\right\}^2+\left\{\sin\frac{\pi}{N}(a+1)\right\}^2}{2\left\{\sin\frac{\pi}{N}(a-1)\right\}^2\cdot\left\{\sin\frac{\pi}{N}(a+1)\right\}^2} \tag{22}$$

In the condition $N \rightarrow \infty$, the equation (22) is expressed as $$P(a,n) = \{(a^2+1)/[n^2\pi^2(a^2-1)^2]\}(1-\cos 2n\pi a) \tag{23}$$

These equations indicate the mode of appearance of a single sine wave whose angular frequency is $a$ times a specific angular frequency when $N$ and $n$ are fixed at certain values and the power spectrum of the specific angular frequency is sought.

The equation (23) is expressed as $P(a,n) = 1$ at the limit value $a = 1$, and as $P(a,n) = 0$ when $a = m/n$ (where $m = 0, 1, 2, 3 \ldots$ and $m \neq n$).

Figure 4:
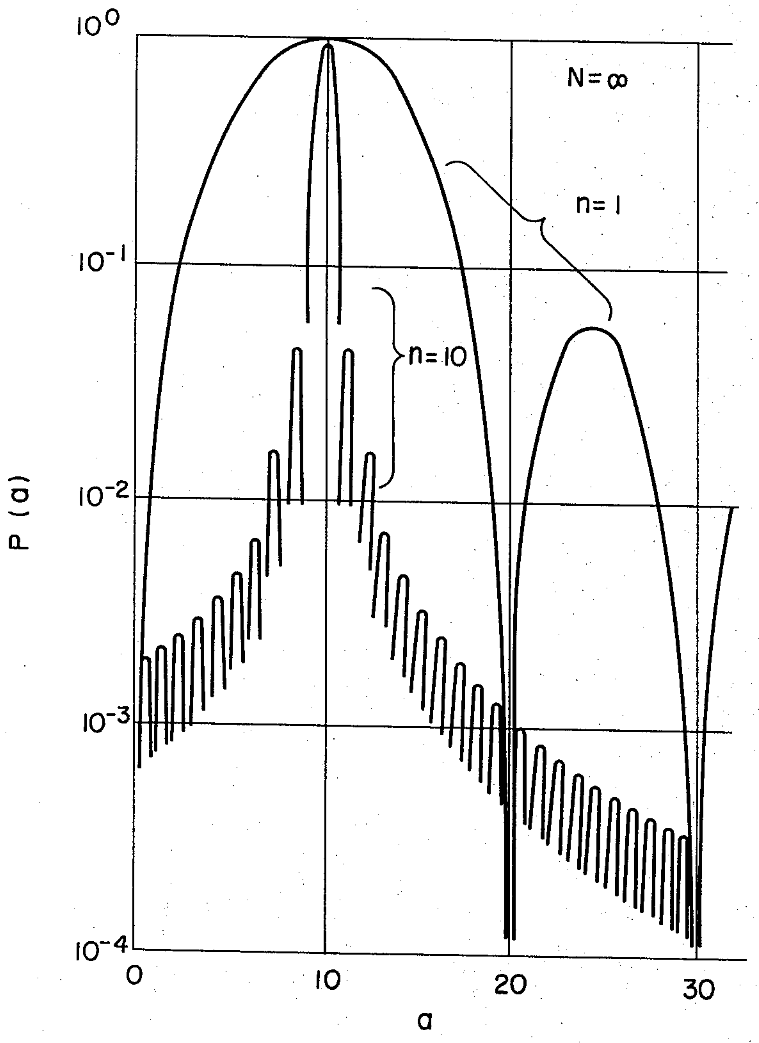
FIGS. 4 to 10 are graphs showing the resolution relative to the number of meshes N and the wave number $n$ in the present invention.

FIG. 4 shows the power spectra $P(a)$ when $N$ is infinitely large or the time axis is meshed into infinitesimally small widths and when $n$ is selected to be $n = 10$ and $n = 1$. In FIG. 4, the horizontal axis represents the value of $a$. It is apparent from FIG. 4 that $P(a)$ is abruptly decreased with the increase in the value of $n$ when $a \neq 1$ and thus the resolution can be improved.

Figure 5:
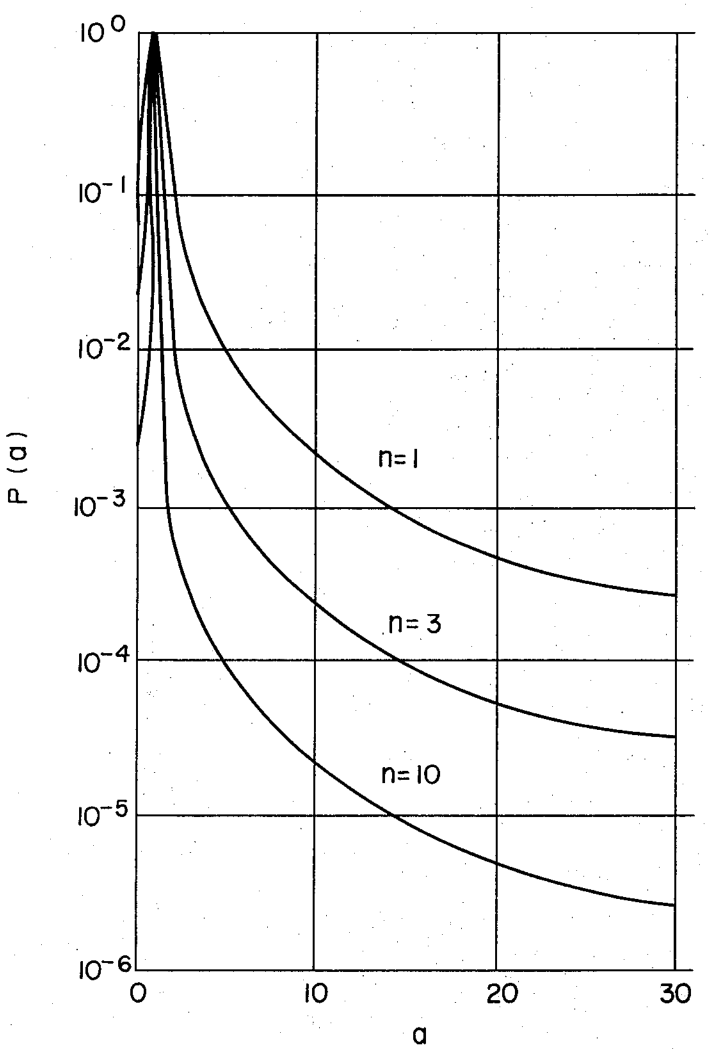

The equation (23) is expressed as $P(a,n) = 0$ when $a = m/n$ (where $m = 0, 1, 2, \ldots$ and $m \neq n$) as above described. FIG. 5 shows the envelopes for the peak points when $n$ is selected to be $n = 1$, $n = 3$ and $n = 10$. It will be seen from FIG. 5 that the value of $P(a)$ is decreased in the order of from $n = 1$ to $n = 10$ at a rate of about $n^2$.

Figure 6:
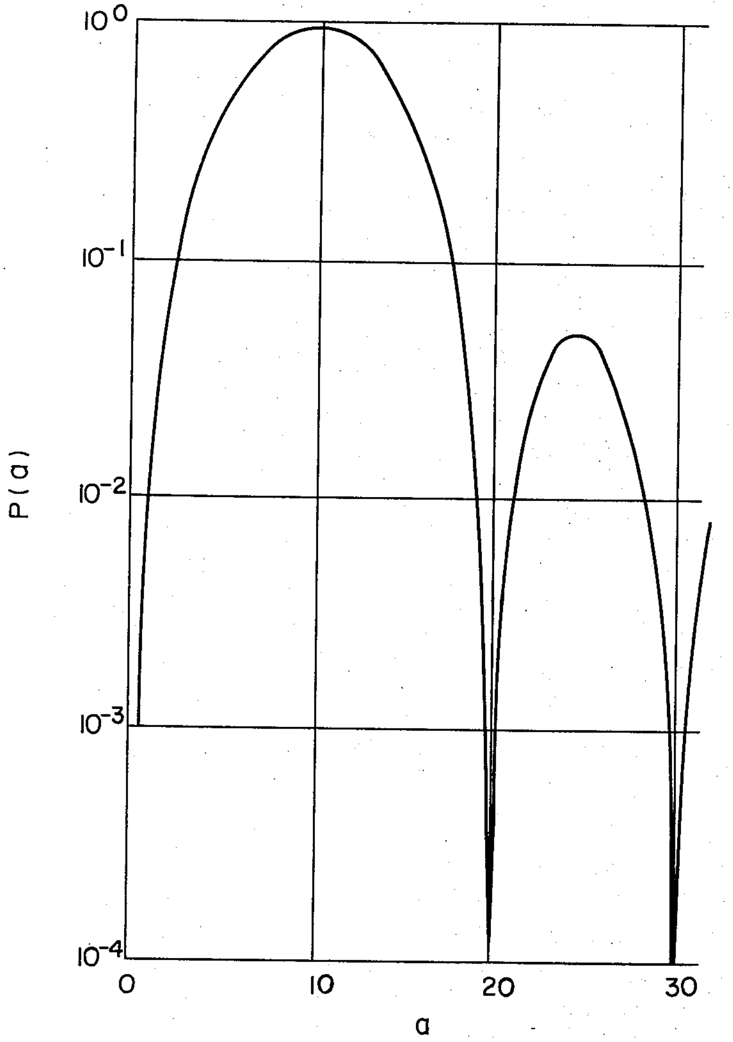

FIG. 6 shows the power spectrum when $N = 8$ and $n = 1$ in the equation (22) in which $N$ is finite. When this power spectrum is compared with the power spectrum shown in FIG. 4 which is obtained when $N = \infty$ and $n = 1$, it will be seen that both are featured by the substantially similar shape. Thus, in spite of the fact that $N$ is desirably as small as possible as described previously, the power spectrum in the case of $N = 8$ does not vary appreciably from the power spectrum in the case of $N = \infty$ as far as the comparison between FIGS. 4 and 6 is concerned. This point will be discussed in more detail hereunder.

Consider the case in which the denominator in the equation (22) is zero. The condition required for the denominator to be zero is $$a = m\,N \pm 1 \tag{24}$$

where $m = 1, 2, \ldots$

On the other hand, in the extreme state in which $a$ approaches $m\,N \pm 1$, that is, $a \rightarrow m\,N \pm 1$, there is a limit value given by $$\lim_{a \rightarrow mN\pm1} P(a, N, n) = \frac{1}{(mN \pm 1)^2}\left(\frac{\sin\frac{\pi}{N}}{\frac{\pi}{N}}\right)^2 \tag{25}$$

Figure 7:
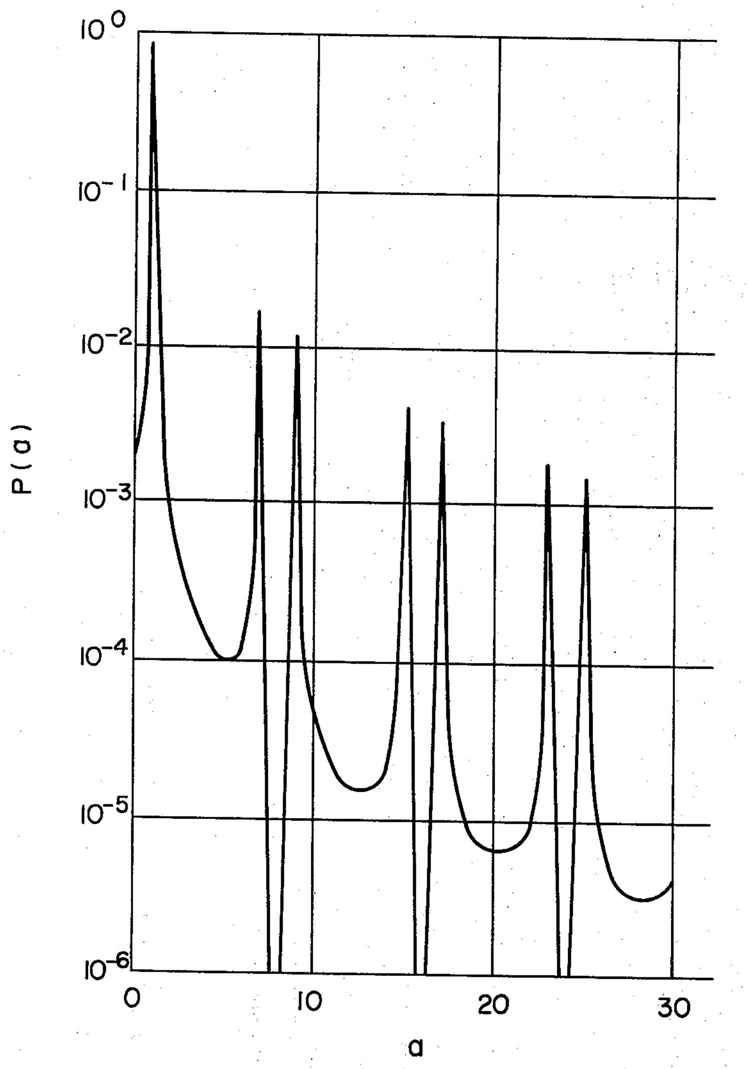
Figure 8:
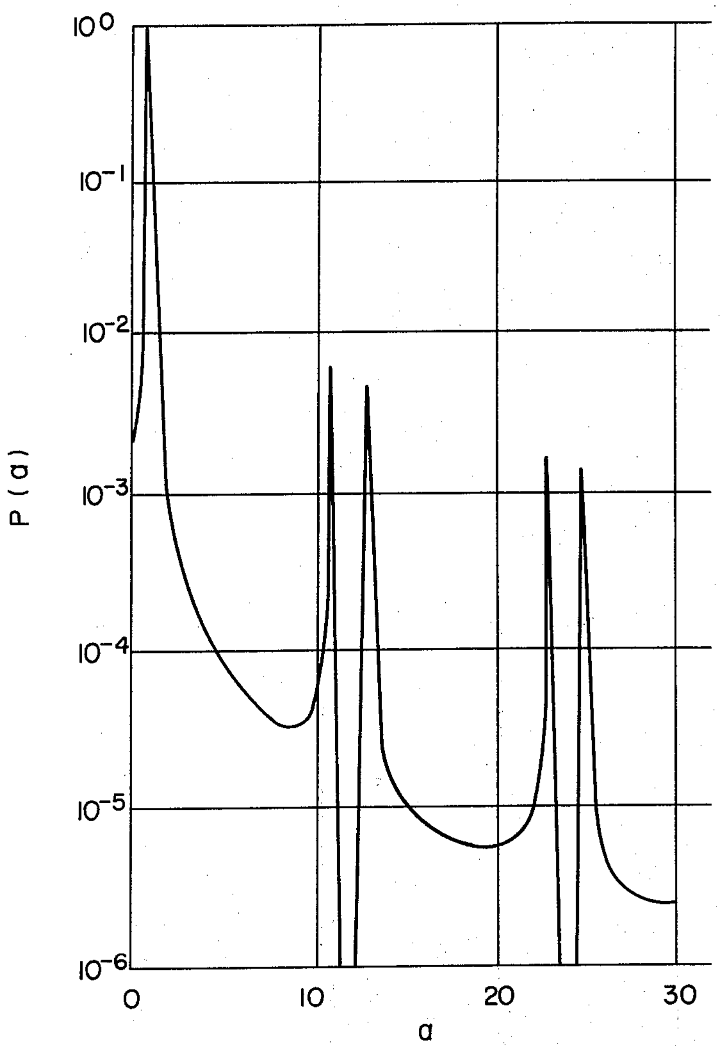
Figure 9:
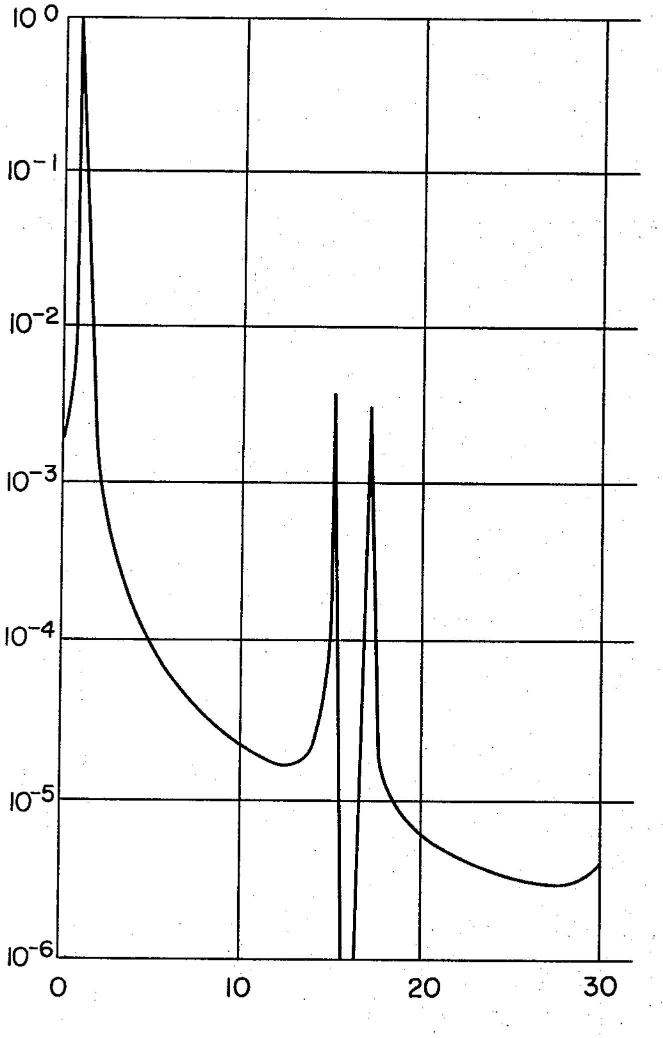
Figure 10:
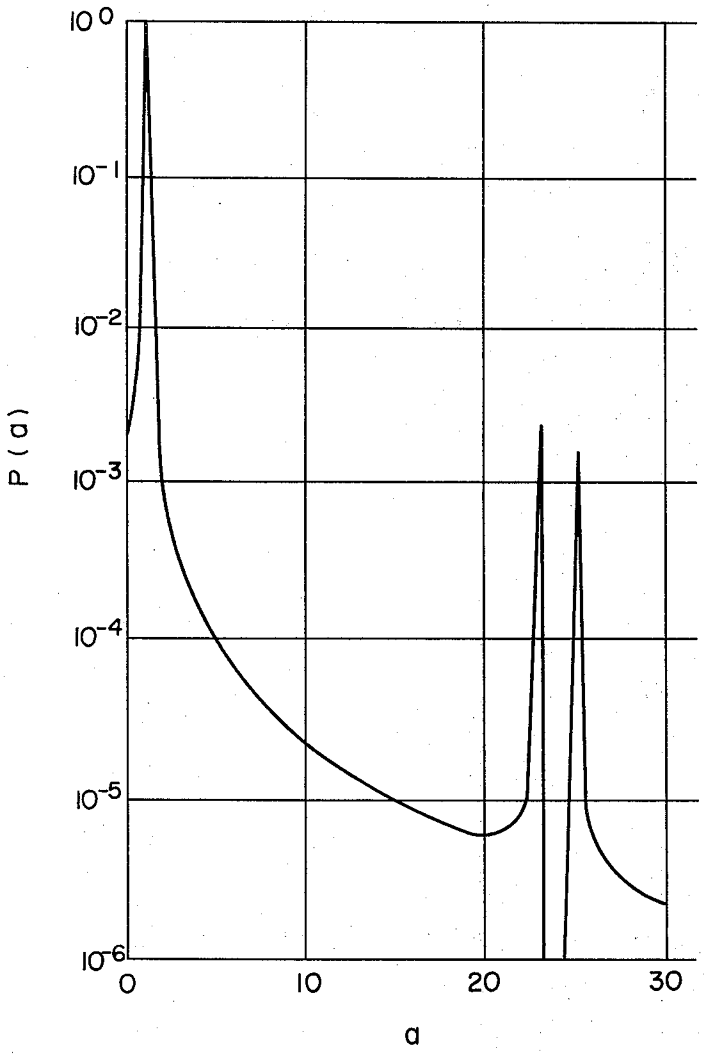

FIGS. 7 to 10 show the envelopes actually obtained when $n$ is selected to be $n = 10$ and $N$ is variously varied in the equation (22). From comparison between these graphs and the graph shown in FIG. 5 which is obtained with $n = 10$, it will be seen that singular points appear in the vicinity of the values of a given by the equation (24). The smaller the value of $N$, the more these singular points appear, and these singular points include one which appears in close proximity to $a = 1$. Therefore, a very small value of $N$ is undesirable. However, as seen in FIG. 7, the highest singular point appearing at $a = 7$ is of the order of 1/50 in the graph obtained when $N = 8$ in the equation (22). In analysis of noises occurring in a nuclear reactor or of sound, higher frequency components have correspondingly smaller values. In such analysis, the presence of singular points of the kind above described does not substantially offer any problem. However, in the case in which a peak appears in each of higher harmonics produced by the vibration of means such as a motor, $N$ must be suitably determined taking the state of singular points into consideration.

In Table 3 is shown how to determine $N$ and $l$ when the sampling frequency is selected to be 200 Hz and the analysis frequency points are selected at intervals about 1.2 times that of the previous one within a range of from 0.01 to 100 Hz. Though there exist $N$'s being fractions at and above 41.7 Hz, they can be processed by a simple procedure similarly to that for integral $N$'s. Further, though the values of $N$'s are less than 8 at and above 28.6 Hz, the above-mentioned singular point can be eliminated by passing $f(t)$ through a sharp low-pass filter at 100 Hz before the sampling is performed.

TABLE 3

| N | $l$ | $f$ (Hz) | N | $l$ | $f$ (Hz) |
|---|---|---|---|---|---|
| 2 | 1 | 100.0 | 8 | 26 | 0.492 |
| 12/5 | 1 | 83.3 | 8 | 32 | 0.781 |
| 3 | 1 | 66.7 | 8 | 38 | 0.658 |
| 7/2 | 1 | 57.1 | 8 | 46 | 0.543 |
| 4 | 1 | 50.0 | 8 | 56 | 0.446 |
| 24/5 | 1 | 41.7 | 8 | 68 | 0.368 |
| 6 | 1 | 33.3 | 8 | 83 | 0.301 |
| 7 | 1 | 28.6 | 8 | 100 | 0.250 |
| 8 | 1 | 25.0 | 8 | 120 | 0.208 |
| 10 | 1 | 20.0 | 8 | 150 | 0.167 |
| 12 | 1 | 16.7 | 8 | 180 | 0.139 |
| 14 | 1 | 14.3 | 8 | 220 | 0.114 |
| 8 | 2 | 12.5 | 8 | 260 | 0.0962 |
| 10 | 2 | 10.0 | 8 | 320 | 0.0781 |
| 12 | 2 | 8.33 | 8 | 380 | 0.0658 |
| 14 | 2 | 7.14 | 8 | 460 | 0.0543 |
| 8 | 4 | 6.25 | 8 | 560 | 0.0446 |
| 8 | 5 | 5.00 | 8 | 680 | 0.0368 |
| 8 | 6 | 4.17 | 8 | 830 | 0.0301 |
| 8 | 7 | 3.57 | 8 | 1000 | 0.0250 |
| 8 | 8 | 3.13 | 8 | 1200 | 0.0208 |
| 8 | 10 | 2.50 | 8 | 1500 | 0.0168 |
| 8 | 12 | 2.08 | 8 | 1800 | 0.0139 |
| 8 | 15 | 1.67 | 8 | 2200 | 0.0114 |
| 8 | 18 | 1.39 | 8 | 2600 | 0.00962 |
| 8 | 22 | 1.14 | | | |

As is evident from the above description, according to the present invention the number of meshes $N$ and the wave number $n$ have a particular relation with the resolution. Consequently, when $N$ and $n$ are to be practically determined after the frequency points have been determined, the above-mentioned matter must sufficiently be taken into consideration. Though it will not be mentioned at what values $N$ and $n$ are set in the various embodiments described below, it will be evident that this never means that the resolution is not taken into consideration.

Though Equations (11) and (12) are for $N = 16$, Equation (7) can be simplified by the fact that how many $N$'s there are between 0° and 90°, that is, what the value of $N/4$ is since sine and cosine waves are repetition of the elements in 90° as stated above. Of course there happens to be the case of $N < 4$ where no mesh width is present between 0° to 90°. However, even in this case Equation (7) can similarly be simplified by considering the range of from 0° to 180° or from 0° to 360°. If the value of $N/4$ is not an integer but has a decimal fraction, Equation (7) cannot be simplified from the standpoint of the repetition at each 90°. In such a case, the simplification of the equation can be effected by considering a minimum period. In the following embodiments of the present invention, the description will be made with reference only to the case in which $N/4$ is a positive integer, that is, such a case as Equations (11) and (12) which require elements of sine and cosine waves repetitive with a period of 90°.

Figure 11:
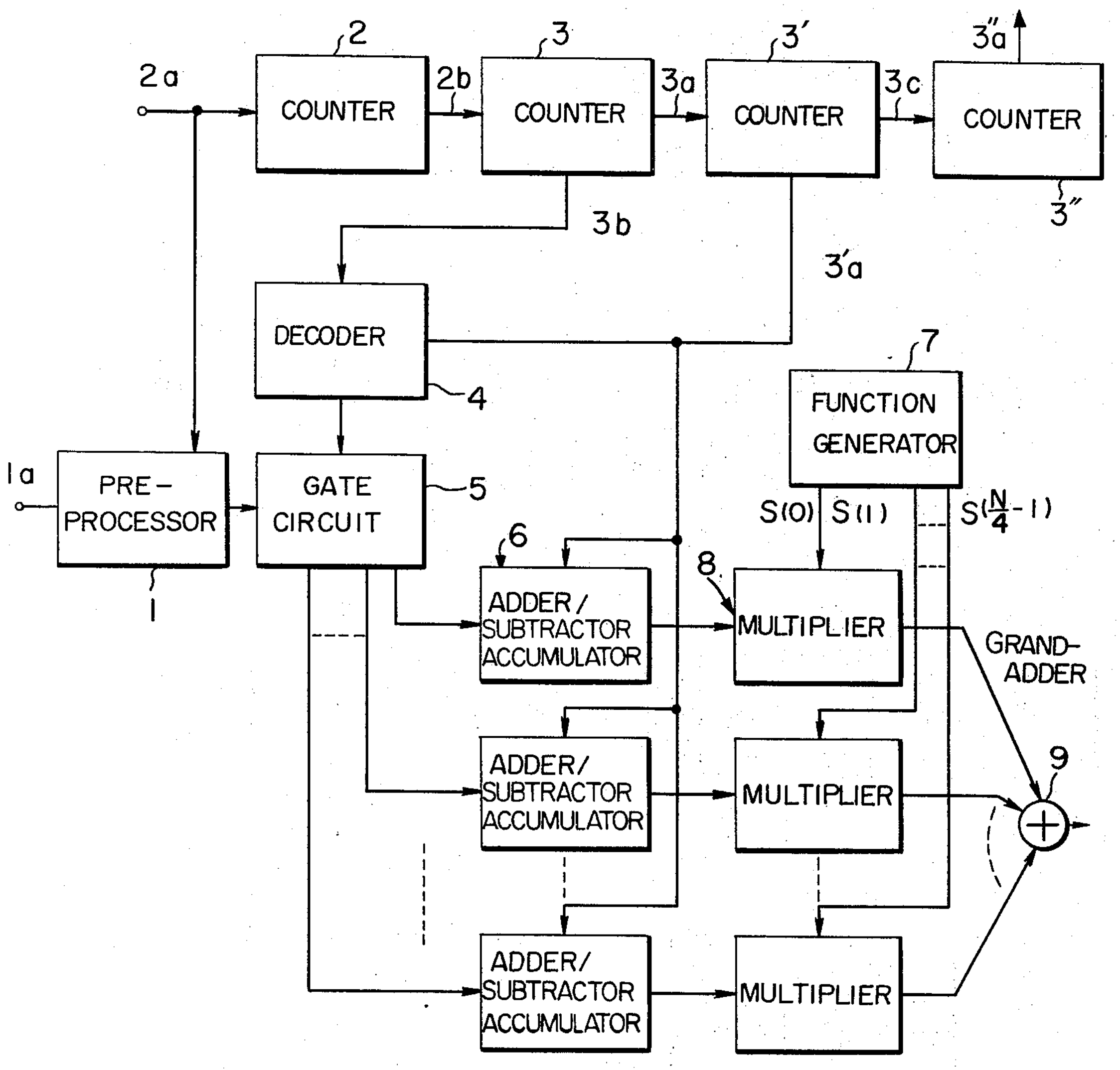
FIG. 11 is a circuit diagram, shown in block form, of an embodiment of the present invention.
Figure 12:
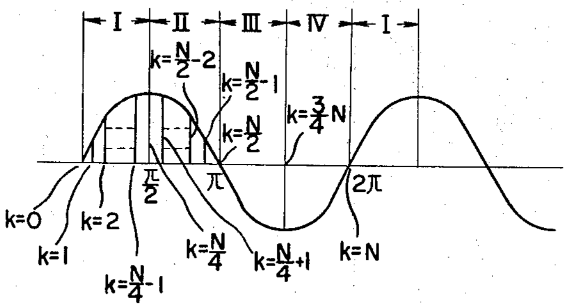
FIG. 12 is a waveform for explaining the operation of the embodiment of the present invention shown in FIG. 11.

An embodiment of the present invention in which $N/4$ is an integer is shown in FIGS. 11 and 12. In FIG. 12, one period is divided into I, II, III, and IV. In I and II, $k = 1$ and $k = (N/2) - 1$, respectively, take the same sine wave element sin $T_0$, $k = 2$ and $k = (N/2) - 2$, respectively, take the same sin $2T_0$, and so on. In I and III, the sine wave elements are opposite to each other in their signs. The relation of IV to I is similar to that of II to I, but the signs of the sine wave elements are opposite. Consequently, this embodiment is constructed such that sine wave elements between 0 to $\pi/2$, i.e., between 0° to 90° are prepared beforehand and the function values $S_k$ of the quantity to be analyzed are alloted with signs to II, III, and IV according to the states of II, III, and IV.

In FIG. 11, reference numerals 2, 3, 3' and 3'' designate counters, 4 designates a decoder, 5 designates a gate circuit, 1 designates a pre-processor, 6 designates adder/substactor system, 7 designates a function generator, 8 designates a multiplier system, and 9 designates a grand adder. The signal 1*a* is an analog signal of the time function $f(t)$ of the quantity to be analyzed. The signal 2*a* is a clock signal produced synchronously with the sampling period. In the pre-processor 1 the time function $f(t)$ is subjected to sampling by the clock signal to provide the function value $f(\tau i)$ and the sampled function value $f(\tau i)$ is A-D converted into a digitized signal $f_i$. The counter 2 successively counts the clock signals and is reset at each time the count amounts to $l$. The counter 2 supplies an output pulse signal 2*b* to the counter 3 at each time the counter 2 is reset. The counter 3 in turn successively counts the output signals from the counter 2 to obtain a quarter of the number of meshes $N$, i.e., $N/4$. The counter 3 is reset at each time the count amounts to N/4 to supply an output pulse signal 3*a* to the counter 3'. The counter 3' is composed of two bits, represents the division of I, II, III and IV in FIG. 12, and supplies one signal 3*c* to the counter 3'' at each time four signals 3*a* arrive at the counte 3'. The counter 3'' counts the wave number $n$, produces an end signal 3''*a* at each time the count amounts to a predetermined wave number $n$, and supplies an end instruction to the over-all system.

The data in counter 3 represent the sequence numbers of the mesh points in the individual divisions. The content "00" of the counter 3' represents I, "01" represents II, "10" represents III, and "11" represents IV.

The decoder 4 decodes the sequence numbers of the mesh points in the individual divisions. Since, as has been explained referring to FIG. 12, the counts in I and II correspond to each other such that $k = 1$ corresponds to $k = (N/2) - 1$, the function value $f_i$ cannot be taken in as it is even if the values of $k$ coincide. The same holds for III and IV. Further, for I and II, III and IV, sin $0 = 0$ and sin $\pi/2 = 1$, respectively, at $k = 0$, thus different in their values. Consequently, the contents of the counters 3 and 3' must be decoded taking these circumstances into consideration. The signal of the less significant bit in the counter 3' effects the allocation of the count of the counter 3. This allocating operation is controlled in such a manner that when the less significant bit is "0," the count is allocated to I and III, and when the less significant bit is "1," the count is allocated to II and IV. The gate circuit 5 is a circuit which effects successive allocation of the function value $f_i$ taken in the pre-processor 1 by the signal decoded by the decoder 4.

The adder/subtractor system 6 comprises $N/4$ adder and subtractors. Each adder and subtractor performs the switching operation between addition and subtraction according to the count of the more significant bit in the counter 3'. When the more significant bit is "0," I and II in FIG. 12 are designated, and when it is "1," III and IV are designated. Consequently, when the more significant bit is "0," the adder/subtractor is switched to the addition side, and when the bit is "1,"

the adder/subtractor is switched to the subtraction side. Incidentally, though the number of the adder/subtractors must be $(N/4)+1$ which corresponds to $k=1, 2, \ldots, (N/4)-1$ and $k=0$ corresponding to 0, , $\pi$, $2\pi$, . . . and $k=0$ corresponding to $\pi/2$, $(3/2)\pi$, . . ., it is sufficient with $N/4$ adder/subtractors since the sine wave is 0 at $k=0$ which corresponds to 0, $\pi$, $2\pi$, . . . This is because if $\sin kT_0$ in $S_k \sin kT_0$ is zero, it is unnecessary to obtain $S_k$.

The multiplier system 8 comprises $N/4$ multipliers correspondingly to the adder/subtractors, respectively, of the adder/subtractor system 6. Signals $S(0)$, $S(1)$, $S(2), \ldots, S(N/4-1)$ from the function generator 7 and signals from the adder/subtractors are supplied to the individual multipliers to perform multiplication of the individual terms of Equation (11). Here, $S(0)$ at the output of the function generator 7 represents the value 1 of the sine waves $\pi/2$, $(3/2)\pi$, . ., and not the value 0 of the sine waves 0, $\pi$, $2\pi$, . . . The results of the multiplications performed by the individual multipliers are supplied to the grand adder 9 by which grand addition such as Equation (11) is performed. The function generator may be such one as merely stores beforehand the function values of the individual sine waves, and may comprise resisters, for example.

Figure 13:
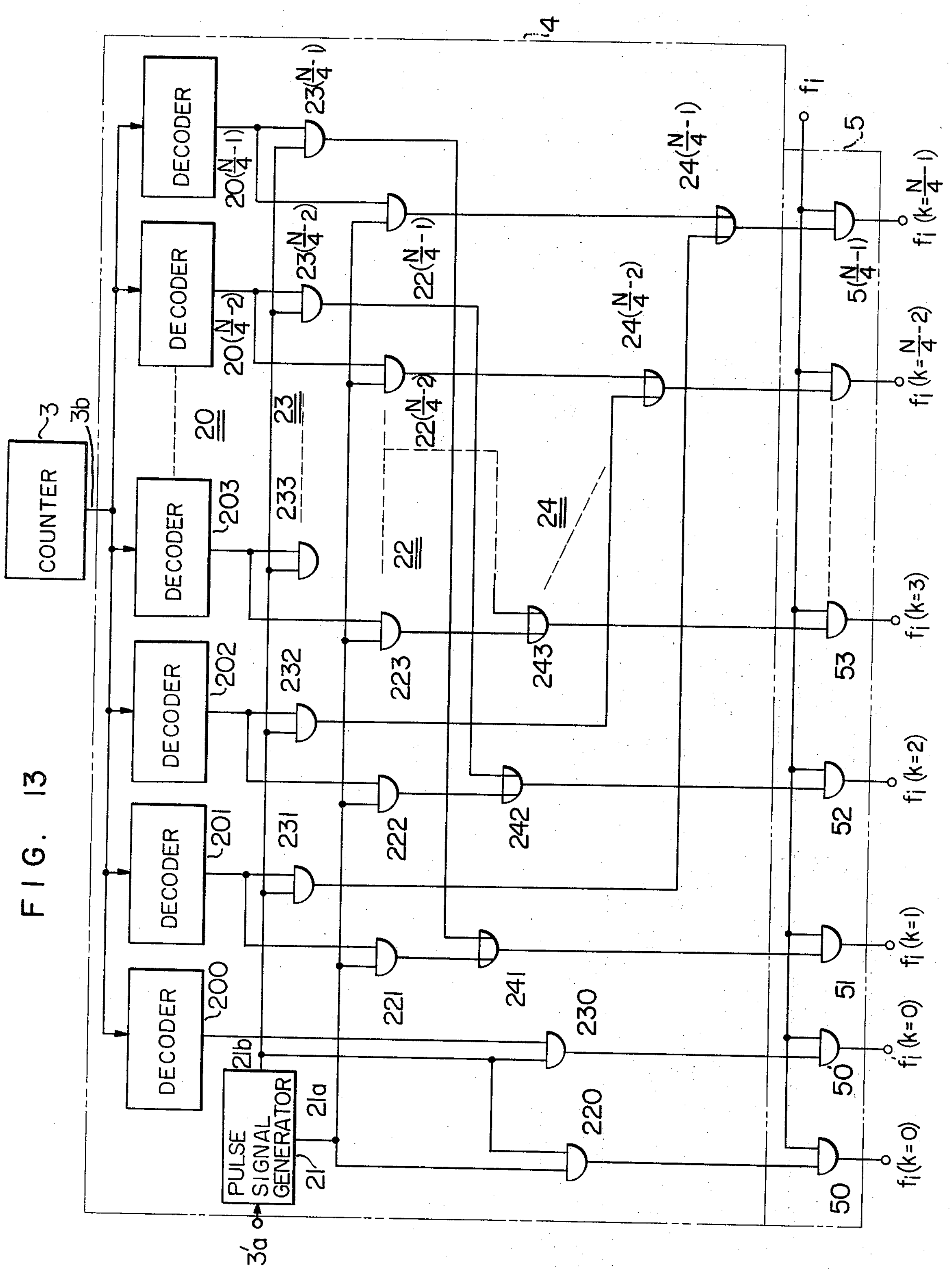
FIG. 13 is a schematic diagram showing a particular constitution of the decoder and gate circuit in the circuit shown in FIG. 11.

In FIG. 13 is shown an example of the decoder 4 and the gate circuit 5 shown in FIG. 11. A decoder system 20 which decodes the counts of the counter 3 comprises decoders 200, 201, . . . , 20$(N/4-1)$ which decodes counts 0, 1, 2, . . ., $(N/4)-1$, respectively. Reference numeral 21 designates a pulse signal generator circuit which produces control pulses 21*a* and 21*b* upon the receipt of the signal from the counter 3′. When the lower significant bit of the signal 3′*a* is "0" or even, the signal generator circuit 21 produces the control pulse 21*a*, and when the lower significant bit is "1" or odd, the generator 21 produces the control pulse 21*b*. Reference numerals 22 and 23 designate AND gate circuit systems, and numeral 24 designates an OR gate circuit system. The AND gate circuit system 22 is controlled by the control pulse 21*a* indicating the even number, and the AND gate circuit system 23 is controlled by the control pulse 21*b* indicating the odd number. In the case of the even number which corresponds to I and III in FIG. 12, the content of the counter 3 produces an output signal through the decoder and the AND gate 22*i* ($i=0, 1, 2, \ldots, (N/4)-1$) specified by the count of the counter 3. In the case of the odd number which corresponds to II and IV in FIG. 12, an output signal is produced through the selected AND gate 23*i* ($i=0, 1, 2, \ldots, (N/4)-1$). The reason why the AND gate 23*i* is selected is that in I and III the absolute values of the sine wave functions at $k=0$, and $k=1, \ldots, N/4-1$ are in agreement, while in II and IV the state is opposite to I and III, that is, $k=1$ in I corresponds to $k=(N/2)-1$ in II and $k=N-1$ in IV, $k=2$ in I corresponds to $k=N/4-2$ in II and IV, and so on. In the case of $k=0$, since there occur $\sin 0=0$ and $\sin \pi/2=1$ which are quite different from each other, the construction of the AND gate system is different from that of the remaining AND gate system. The OR gate circuit system 24 comprises OR gate 241, 242, . . ., 24$(N/4-1)$ which pass an output signal according to even or odd number, for example, in the OR gate 241, an output signal is passed as the even $k=1$ and odd $k=(N/4)-1$.

The gate circuit 5 which selects the function value $f_i$ from the pre-processor 1 by the control signal available from the decoder 4 comprises AND gates 50, 50′, 51, 52, . . ., 5$(N/4-1)$. The control signals from the decoder 4 to the AND gates are successively produced during the supply of $l$ data from the pre-processor 1. For example, in the case of an even number of the contents in the counter 3′ and the count "1" of the counter 3, a control signal is produced through the AND gate 221 and the OR gate 241 to keep the AND gate 51 open until $l$ function values $f_i$ are successively supplied. When the content of the counter 3 varies from, for example, 1 to 2, the decoder 202 is driven, and, in the case of an even number of the contents in the contents in the counter 3′, the AND gate 222 is selected to produce a control signal through the OR gate 242, and open the AND gate 52 to pass $l$ function values $f_i$. The AND gate 50 is for 0, $\pi$, $2\pi$, . . ., and the AND gate 50′ is for $\pi/2$, $(3/2)\pi$, . . . In the above description the control signal supplied to the AND gates 50, 50′, 51, . . . has a sufficient time width for passing $l$ function values. The time width is fundamentally obtained by the fact that the decoder system 20 temporarily holds the decoded signal and the pulse generator 21 performs wave shaping. However, in some cases the control signal supplied to the gate circuit 5 does not have a sufficiently exact time width for passing $l$ function values due to the circuit characteristics of the AND gate systems 22 and 23 and the OR gate system 24. In such cases, it is necessary to regulate timing by providing an additional shaping circuit to the input of the gate circuit 5. Or alternatively, it may be well to employ the control signal supplied by the decoder 4 as a timing signal, in which case the pulse signal generator 21 is provided to the output of the decoder 4.

Figure 14:
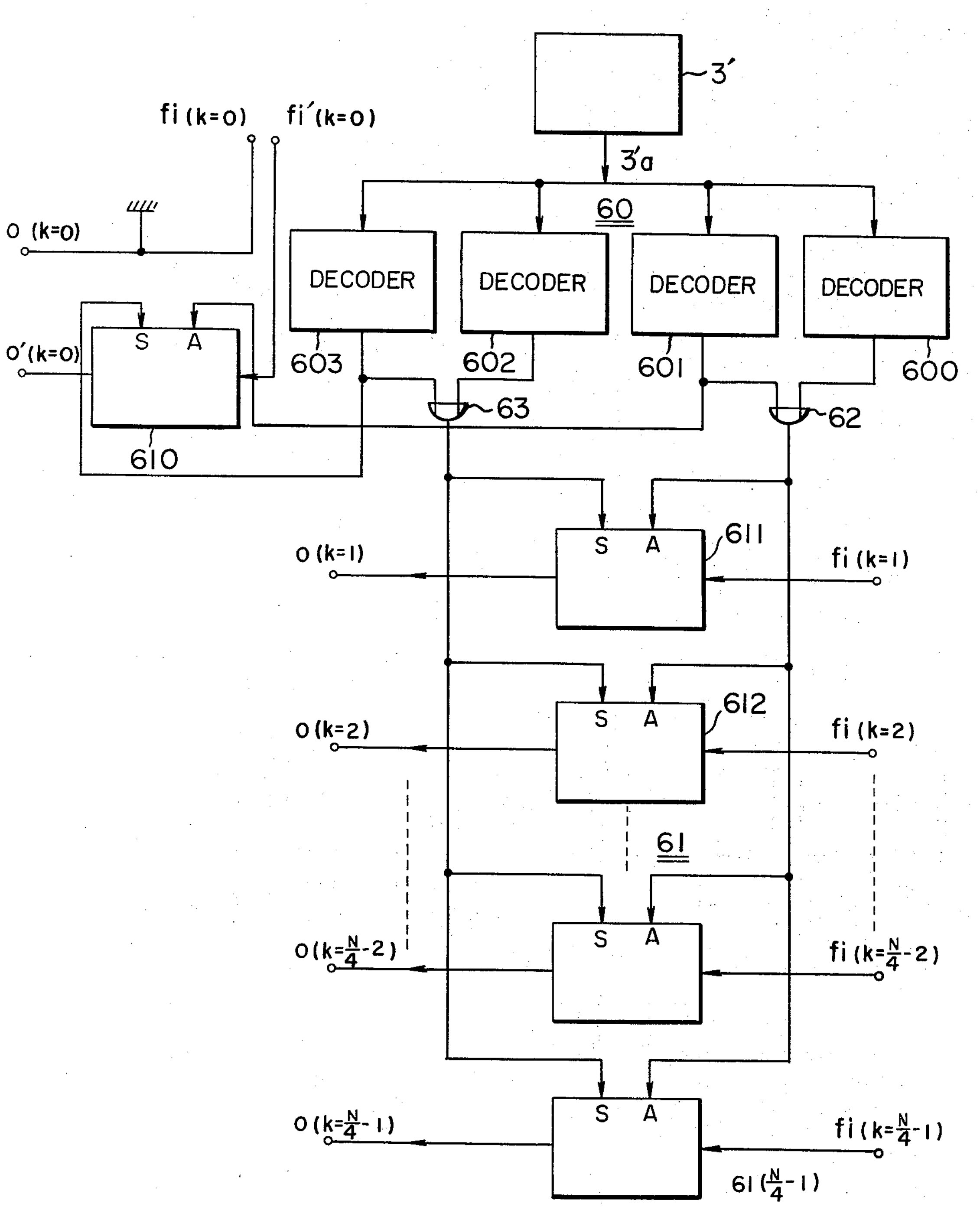
FIG. 14 is a schematic diagram showing a particular constitution of the adder/substractor in the circuit shown in FIG. 11.

FIG. 14 shows an example of the adder/subtractor 6. The adder/subtractor 6 performs addition and subtraction for each of I, II, III and IV regions in FIG. 12. Whether addition or subtraction is determined by the content of the counter 3′. If the content is "00" or "01," then the function values are between 0 to $\pi$ and addition is performed. If the content is "10" and "11," the values are between $\pi$ and $2\pi$ and subtraction is performed. Incidentally, as shown in FIG. 13, two values, 0 and 1, are taken for $k=0$. The distinction between these values cannot be made in the above-mentioned regions, and a peculiar format is required.

In FIG. 14, a logic circuit 60 comprises decoders 600, 601, 602 and 603 which decode the content of the counter 3′. The decoder 600 decodes "00" of the counter 3′, the decoder 601 decodes "01" of the counter 3′, and the decoders 602 and 603 decodes "10" and "11" of the counter 3′. Consequently, the decoders 600 and 601 supply an addition instructing signal to an adder/subtractor system 61 to cause it to perform an adding operation. Similarly, the decoders 602 and 603 supply a subtraction instructing signal to the adder/subtractor system 61 to cause it to perform a subtracting operation.

The adder/subtractor system 61 comprises adder/-subtractor circuits 610, 611, . . ., 61$(N/4-1)$. Each adder/subtractor circuit is provided with an addition instructing terminal A to which the above-mentioned addition instructing signal is applied and a subtraction instructing terminal B to which the subtraction instructing signal is applied. Different from the adder/subtractor circuits 611, 612, . . ., 61$(N/4-1)$, the adder/subtractor circuit 610 is supplied at its terminal A with an output signal from the decoder 601 and at its terminal B with an output signal from the decoder 603. This peculiar construction of the adder/subtractor circuit 610 results from the fact that it relates to the sine wave elements $\pi/2$, $(3/2)\pi$, . . . The function value $f_i$ $(k=0)$ is grounded. This is because it relates to the sine wave elements 0, $\pi$, $2\pi$, . . . which are 0 and no addition nor subtraction is necessary.

Each adder/subtractor circuit has an adding/subtracting operation section and a register for temporarily storing the operated result. The register is temporarily storing the value subjected to addition or subtraction at the operation section, and when a fresh operand signal $f_i$ $(k=j)$, where $j=0, 1, 2, \ldots, (N/4)-1$, is supplied thereto, addition or subtraction is performed between the fresh operand and the stored value, and, at the same time, the content of the register is cleared to again temporarily store the result of the addition or subtraction. Further, though not shown, the register is adopted to be supplied with a read-out instruction signal for instructing read-out of the grand sum or difference stored in the register simultaneously with the end of the arithmetic operation determined by the wave number. In FIG. 14, since the addition instructing signal from an OR gate 62 and the subtraction instructing signal from an OR gate 63 are supplied to all adder/subtractor circuits, all of them perform arithmetic operation. However, this fact does not cause any problem in this example.

For example, if it is assumed that the addend signals $f_i$ $(k=1)$ are supplied to the adder/subtractor circuit 611 and the circuit is performing addition with respect to $l$ data in accordance with an addition instructing signal, the addend signals for the remaining adder/subtractor circuits are not supplied thereto so that no addition operation is substantially performed even if they are put in addition states by the addition instructing signal.

When the operations of the gate circuits or the like are unstable, malfunction may occur, that is, an unnecessary arithmetic operation happens to occur. To prevent these adverse conditions it is sufficient to provide the addition and subtraction instructing terminals of each adder/subtractor circuit with AND gates which are controlled by the output signal from the decoder 4 as shown in FIG. 13.

According to the above-described various structures, grand sum or difference signals 0 $(k=0)$, 0′ $(k=0)$, 0 $(k=1)$, . . . such as function values in the brackets of the right-hand member of Equation (11) can be provided as output signals of the adder/subtractor circuit. The above embodiment is for sine waves, but similar structures hold for cosine waves.

The above embodiment has been based on the fundamental standpoint that the entire interval is repetition of an interval of from 0 to $\pi/2$. However, as can be understood from FIG. 12, the entire interval can also be regarded as repetition of an interval of from 0 to $\pi$. In the latter case, the function values $S_k$ are $N/2$ values $k=0, 1, \ldots, (N/2)-1$. An example of Equation (11) for $N=16$ in this case is shown in Table 2. Table 2 is a magnification of the range of from 0 to $\pi/2$ in Table 1 to the range of from 0 to $\pi$, that is, $S(5)$, $S(6)$ and $S(7)$ are added to Table 1. This fact has already been stated. An embodiment in this case will next been shown in FIG. 15.

Figure 15:
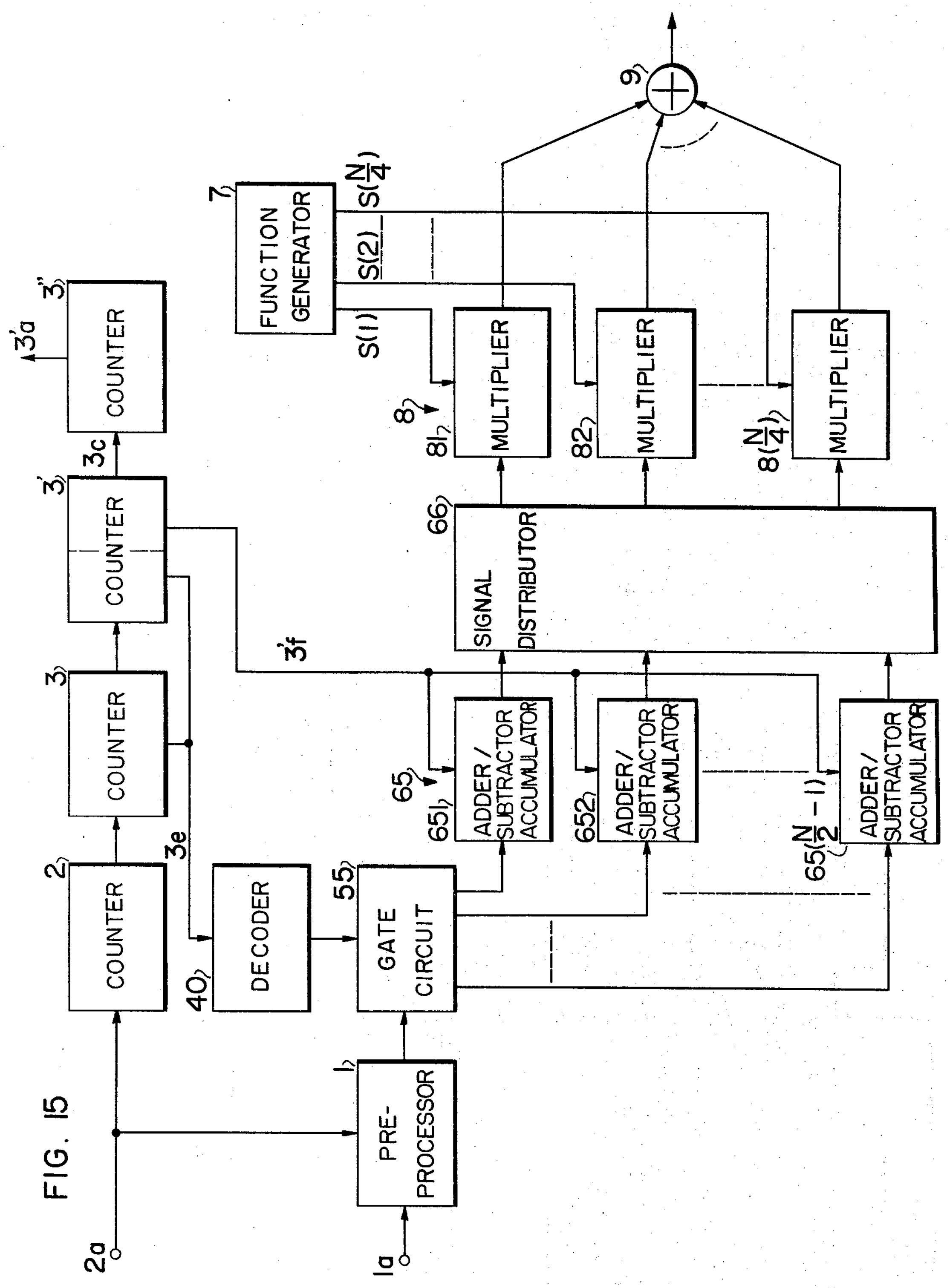
FIG. 15 is a circuit diagram, shown in block form, of another embodiment of the present invention.

The embodiment of FIG. 15 comprises a decoder 40, a gate circuit 55, an adder/subtractor system 65 consisting of $(N/2)-1$ adder/subtractor circuits, and a signal distributor circuit 66. The same reference numerals as in FIG. 11 designate similar components. Though counters 2, 3, 3′ and 3″ are of the same structure as those in FIG. 11, the manner of deriving the signal from the counter 3′ is different from that in FIG. 11. A signal 3′$f$ represents the signal of the most significant bit, and it indicates the interval of from 0 to $\pi$ for "0" and indicates the interval of from $\pi$ to $2\pi$ for "1." The most significant bit indicates whether the function value is positive or negative and is used as an instruction for addition or subtraction to the adder/subtractor system 65. A signal 3$e$ indicates the content of the counter 3 and the less significant bit of the counter 3′, and means the mesh point.

The decoder circuit 40 decodes mesh points of 0, 1, 2, . . ., $(N/2)-1$. Thus it has $N/2$ output terminals. The gate circuit 55 consists of AND gates similarly in FIG. 11, but it is different from FIG. 11 in that the number of the AND gates is $N/2$.

Figure 16:
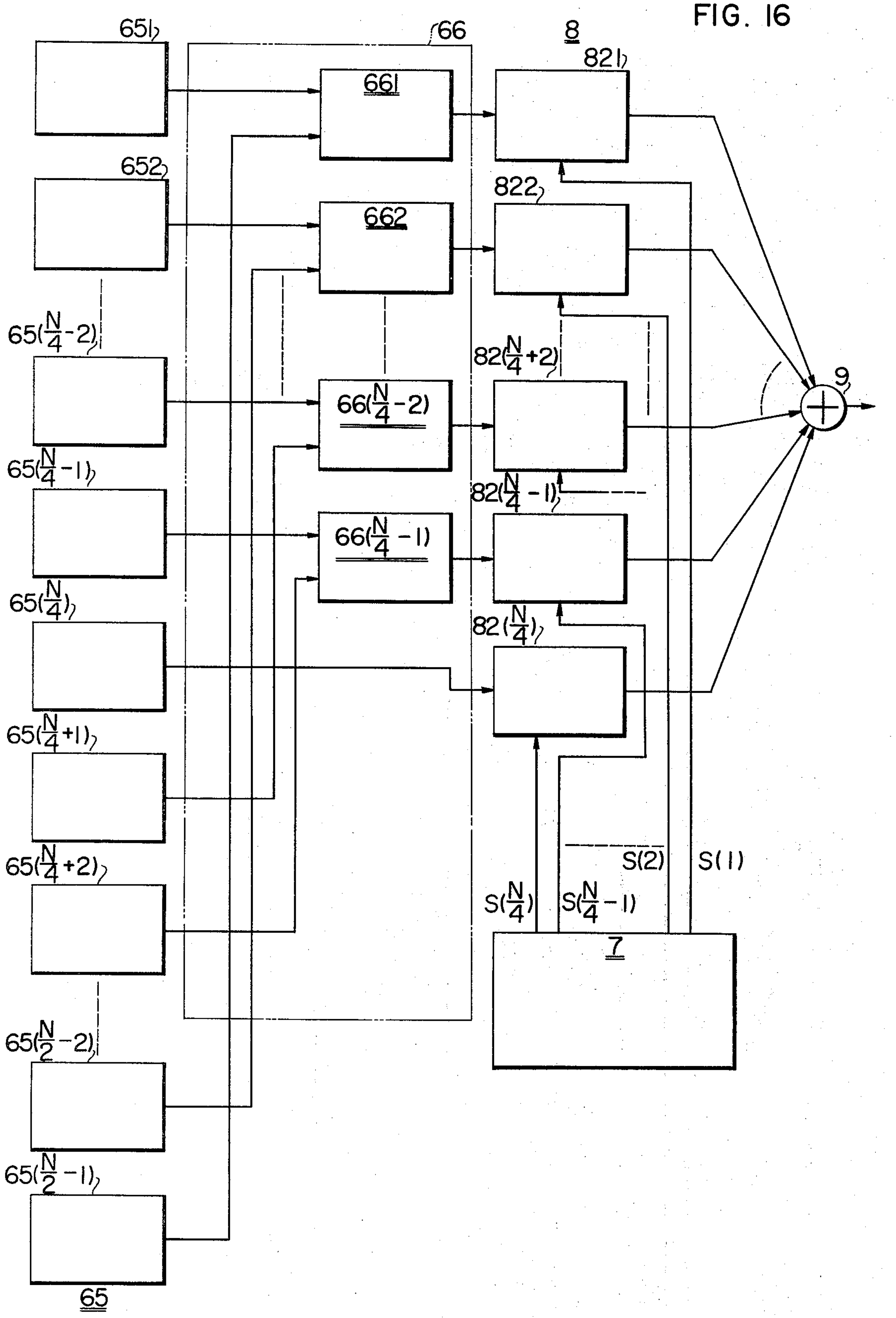
FIG. 16 is a diagram showing a particular constitution of the signal distributor in the circuit shown in FIG. 15.

The adder/subtractor system 65 consists of $(N/2)-1$ adder/subtractor circuits 651, . . ., 65$(N/2-1)$ each having an addition terminal and a subtraction terminal which are switched therebetween by the most significant bit of the counter 3′, the addition being for "0" and the subtraction being for "1." As is seen also from the example of Table 2, $N/2$ adder/subtractor circuits are essentially necessary. However, since $S(0)=0$, it is unnecessary to subject coefficient values to addition or subtraction so that $(N/2)-1$ adder/subtractor circuits 651, 652, . . ., 65$(N/2-1)$ will suffice. At the stage of the end of the arithmetic operation with respect to the wave number determined by $n$, the total coefficient values for $S(1)$, $S(2)$, $S(3)$, . . . are provided by the adder/subtractor circuits 651, 652, . . ., 65$(N/2-1)$, respectively. As has been described referring to Table 2 for $N=16$, the interval of from 0 to $\pi$ can be reduced to the interval of from 0 to $\pi/2$, that is, when the sine wave function values for generalized $N$ are $S(0)$, $S(1)$, $S(2)$, . . ., $S(N/4-2)$, $S(N/4-1)$, $S(N/4)$, $S(N/4+1)$, $S(N/4+2)$, . . ., $S(N/2-2)$, $S(N/2-1)$, and their coefficient values are $C_0$, $C_1$, $C_2$, $C_3$, $C_{(N/4-2)}$, $C_{(N/4-1)}$, $C_{(N/4)}$, $C_{(N/4+1)}$, $C_{(N/4+2)}$, . . ., $C_{(N/2-2)}$, $C_{(N/2-1)}$, respectively, there result $S(1)=S(N/2-1)$, $S(2)=(S(N/2-2)$, . . ., $S(N/4-2)=S(N/4+2)$, $S(N/4-1)=S(N/4+1)$. Consequently, it is necessary to obtain $C_{(N/2-1)}$, $C_2+C_{(N/2-2)}$, . . ., $C_{(N/4-2)}$, $C_{(N/4+2)}$, $C_{(N/4)}+C_{(N/4+1)}$. The signal distributor circuit 66 is an apparatus for obtaining these coefficient values. The signal distributor circuit 66 comprises, as shown in FIG. 16, adders 661, 662, . . ., 66$(N/4-1)$. The adder 661 performs addition of the coefficients $C_1$ and $C_{(N/2)-1}$ provided by the adder/subtractor circuits 651 and 65$(N/2-1)$, respectively. The remaining adders 662, . . ., 66$(N/4-2)$, 66$(N/4-1)$ also perform similar operations. Though a timing chart of the signal distributor circuit 66 for the adders is not shown, coefficient values may be derived after they are produced by the adder/subtractor system 65 to be subjected to a predetermined addition or they are successively derived in the course of production to be successively subjected to the addition. In any case, the timing is not described here because it is not a part of this invention. Any known technique may be employed in this invention.

Different from FIG. 16, the signal distributor circuit 66 can be omitted. For this purpose in this case it is necessary to utilize the adder/subtractor system 65. For example, at the stage that the coefficient values are completely produced the contents of the adder/subtractor circuits 65($N/4+1$), 65($N/4+2$), . . ., 65($N/2-2$), 65($N/2-1$) are supplied to the adder/subtractor circuits 65($N/4-1$), 65($N/4-2$), . . ., 652, 651, respectively, to be added. Incidentally, the coefficient values of the adder/subtractor circuit 65($N/4$) are $\pi/2$, $(3/2)\pi$, . . ., and they are directly supplied to a multiplier 82($N/4$).

Figure 17:
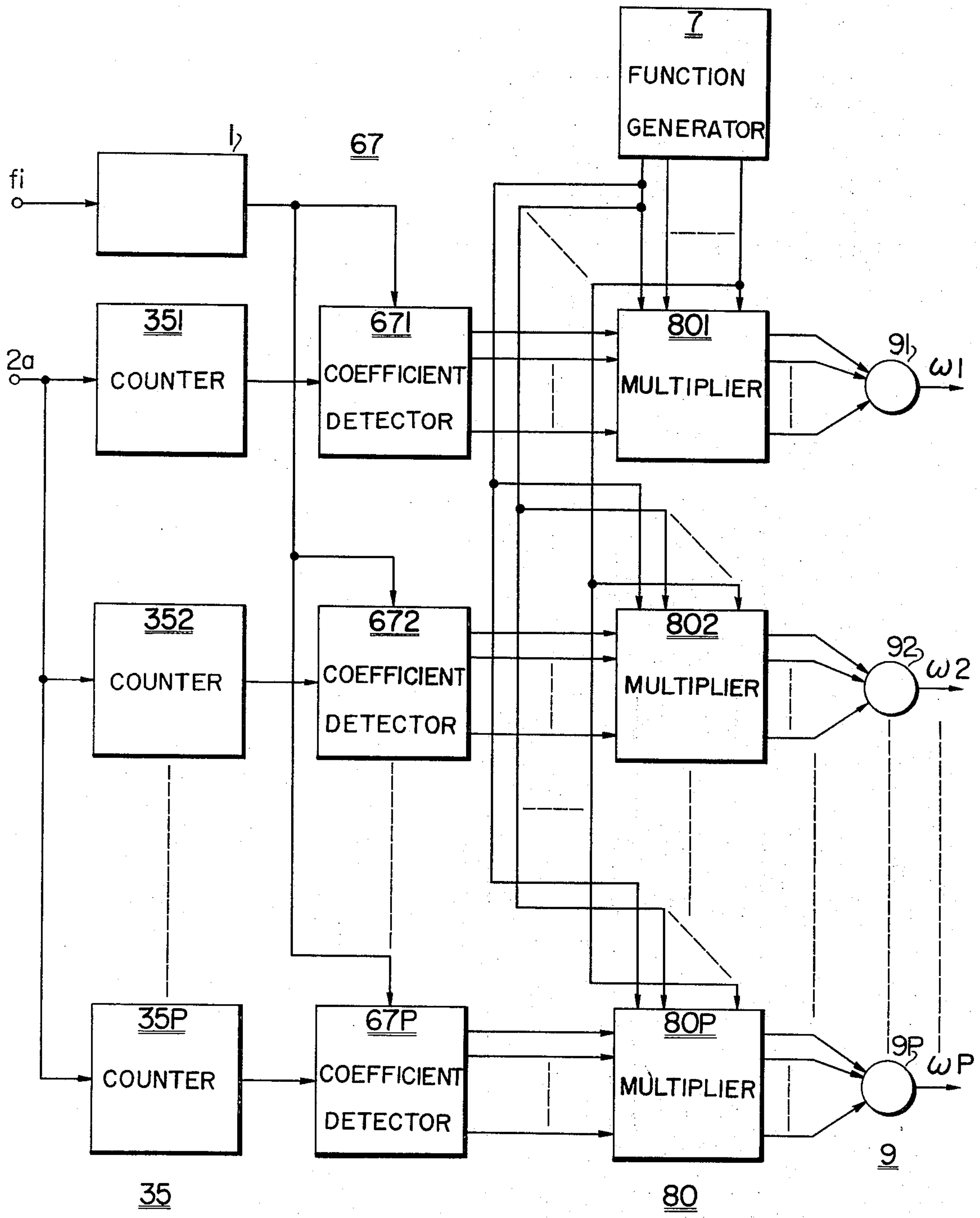
FIG. 17 is a diagram showing a constitution of a system for producing $p$ angular frequencies.

FIG. 17 shows a system for producing $P$ angular frequencies $\omega_1$, $\omega_2$, . . ., $\omega_P$. A counter group 35 consists of counters 351, 352, . . ., 35P, a coefficient detector system 67 consists of coefficient detectors 671, 672, . . ., 67P, a multiplier system 80 consists of multipliers 801, 802, . . ., 80P, and a grand adder system 9 consists of grand adders 91, 92, . . ., 9P. Though the counters of the counter group 35 can be variously embodied as shown in FIGS. 11 and 14, the essential feature thereof consists in different lengths of $l$ which is to determine the angular frequency to be obtained. The coefficient detectors of the coefficient detector system 67 perform allocation of input function values supplied from the pre-processor 1 by timing signals provided by the counters of the counter group 35 and produce a partial sum of the function values provided by the allocation. The coefficient detectors are constructed as shown in FIGS. 11 to 16. Sine wave function values are supplied in common from the function generator 7 to the multipliers of the multiplier system 80, and multiplications are performed therein with output signals from the coefficient detectors. The grand adders of the grand adder system 9 perform the same operation as that shown in FIGS. 11 to 16.

According to the above construction, an input function value $f(t)$ is converted into a digital signal $f_i$ through the pre-processor 1 to be supplied to the coefficient detectors. On the other hand, timing signals corresponding to the analyzing frequencies are produced by the counters to control the coefficient detectors which perform the allocation of input function values by the timing signals and, at the same time, produce partial sums. Each partial sum for each frequency is subjected to multiplication in each multiplier with the sine function to produce a partial term. The partial terms produced by the multiplier are summed by the grand adder provided for each frequency to be analyzed. Thus, at the output terminals of the grand adders the values of Equation (11) corresponding to $\omega_1$, $\omega_2$, . . ., $\omega_P$, respectively are produced. In FIG. 17, since the frequency is determined by the number $l$ of data, the sine function values of the function generator 7 are supplied in common to the multipliers. However, as has already been described, also the value of $N$ relates to the frequency. Consequently, when the value of $N$ as well as the number $l$ of the data is a factor to determine the frequency, the overall construction of the apparatus is somewhat different.

In the above description, the attention is focused on the relation between the analyzing frequency $\omega$ and $l$, $N$, $n$. On the other hand, the maximum length of the data of the input fuction $f(t)$ of the quantity to be analyzed is determined by the wave number. However, since in the power spectral density based on the data length determined by the wave number $n$ the data are those related to a particular period of time, the power spectral density can be obtained only in the form corresponding to the variations in various characteristics at the period of time. This is apparently a peculiar result and has no generality. Of course, even though there is no generality, it is practically an important problem to what extent quantitative variation is there between the generality and the peculiarity. However, even if this fact is not considered, apparently there exists practically the case in which the power spectral density cannot be provided sufficiently exactly with only the wave number $n$. An important countermeasure to such a case is that a power spectral density is produced in each of a plurality ($Z$) of blocks each having the length of data determined by the wave number to thus provide $Z$ power spectral densities. To what value the block number $Z$ is to be determined is dependent on the character of the input function $f(t)$, analyzing frequency $\omega$, and the like. On the other hand, by providing a certain rest period $R$ between blocks, $n$ and $Z$ can be prevented from unnecessarily growing during the measuring time. At what value the rest period $R$ is to be determined is dependent on the empirical law.

In order to practice the concepts of $Z$ and $R$, it is sufficient to provide a counter for counting the rest period $R$ and a counter for counting the block $Z$ behind the counter for counting the wave number $n$ to set the rest period $R$ by the counter for counting $R$ and to set the number of blocks by the counter for counting the block $Z$.

Though various embodiments have been described above, they require a very large number of component parts such as decoders, gate circuits, adder/subtractor circuits, multipliers, etc. This fact has the very favorable effect that the power spectral density can be produced at very high speed, and hence is suitable for high frequency analysis. However, the fact that the overall system becomes bulky as the number of the frequency points to be analyzed becomes large is a grave disadvantage. To overcome this disadvantage, another method must be considered. A simple allocator employing a large capacity memory such as a magnetic core memory as a data storage means will next be described.

Figure 18:
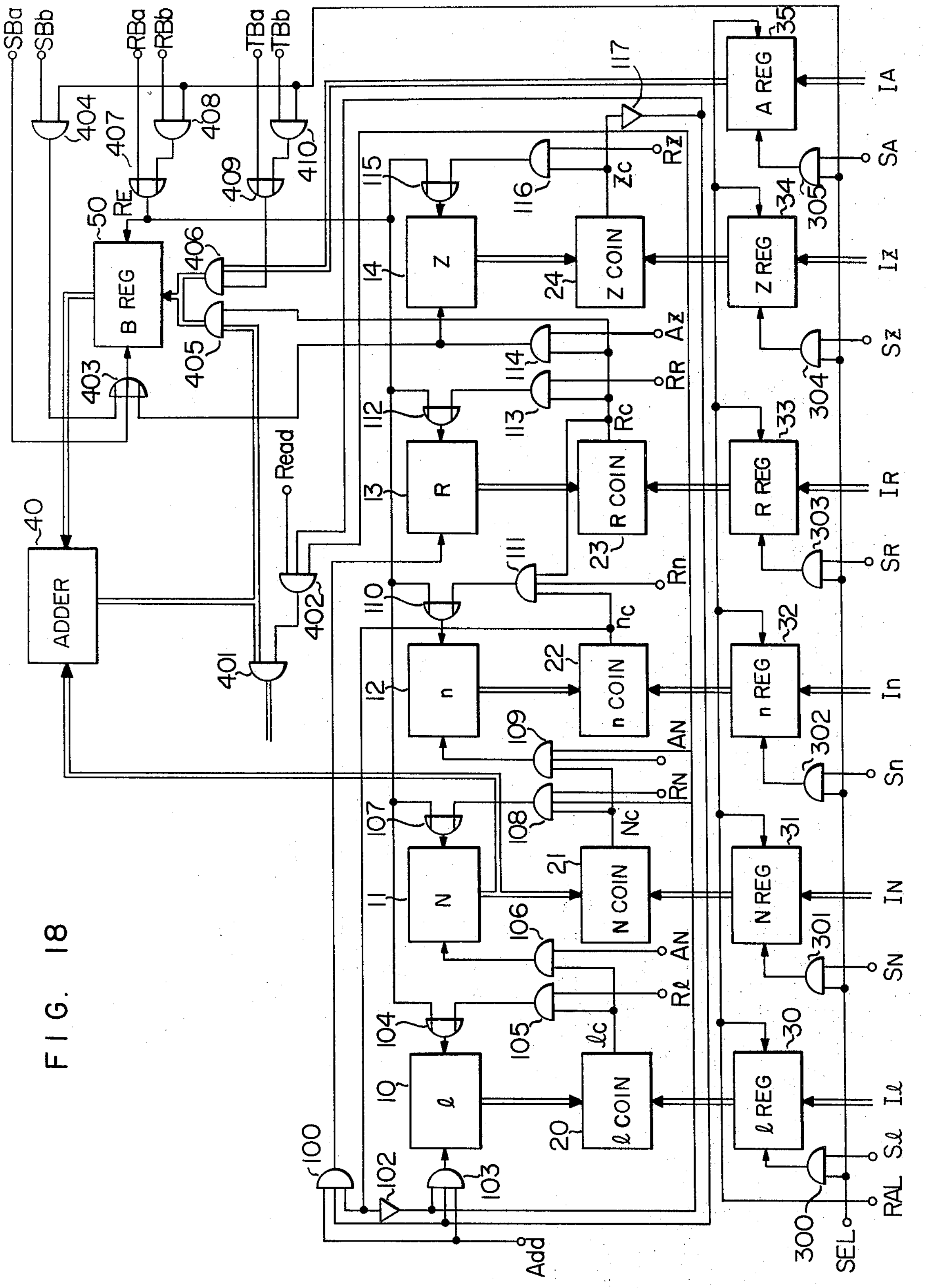
FIG. 18 is a schematic diagram showing a constitution of an embodiment of a data allocator.
Figure 19:
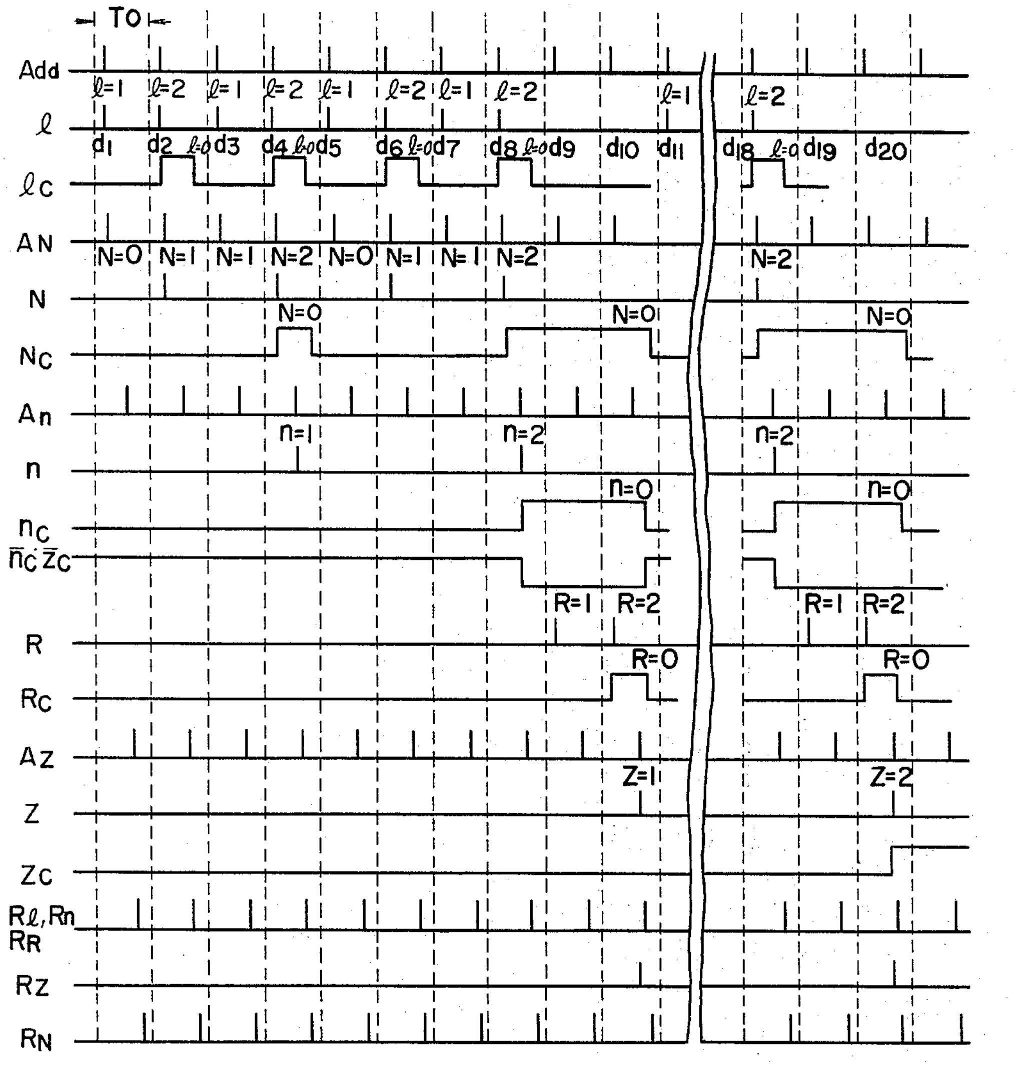
FIG. 19 is a time chart for explaining the operation of the allocator of FIG. 18.

FIG. 18 shows an embodiment of the data allocator and FIG. 19 shows a diagram explanatory of the allocator of FIG. 18. The feature of this embodiment is to average the power spectral density by considering the abovementioned concepts of $R$ and $Z$ in addition to $l$, $N$, $n$. Another feature of this embodiment is the provision of a plurality of coincidence circuits to eliminate the data decoding means such as decoders. The coincidence circuits produce a coincidence signal to provide a control signal when continually applied counts from the counters for counting $l$, $N$, $n$, $R$, $Z$, respectively, and continually applied $l$, $N$, $n$, $R$, $Z$ coincide. A further feature of this embodiment is that the set values of $l$, $N$, $n$, $R$, $Z$ represent the state of $l=2$, $N=2$, $n=2$, $R=2$, $Z=2$, and, at the same time, they indicate the case in which the time period at which data are taken in is $2\pi$. A still further important feature of this embodiment is that when data are stored in the memory, the address of the first data is fixed and the address of the remaining data are determined in relation to the fixed address in accordance with the counted contents of the counter for counting $N$. These features will become apparent as the following description of this embodiment proceeds.

In FIG. 18, an $l$-stage counter 10, an $l$-stage coincidence circuit 20 and an $l$-register 30 are the devices concerned with $l$. If, for example, a value $l = 2$, i.e., $ll$ = "10," where "$ll$" indicates the binary number of counter contents, as shown in FIG. 19, is set in the $l$ register, the value is always fed to the $l$-stage coincidence circuit 20. The coincidence circuit 20 continuously compares the values counted by the $l$-stage counter 10 with the above value "10" set in the $l$ register 30 and delivers a coincidence signal $l_c$ when the counted value of the $l$-stage counter has become "10." These series of operations hold likewise for the devices concerned with $N$ such as an $N$-stage counter 11, an $N$-stage coincidence circuit 21 and an $N$ register 31; for the devices concerned with $n$ such as an $n$-stage counter 12, an $n$-stage coincidence circuit 22 and an $n$ -register 32; for the devices concerned with $R$ such as an $R$-stage counter 13, and $R$-stage coincidence circuit 23 and an $R$ register 33; and for the devices concerned with $Z$ such as a $Z$-stage counter 14, a $Z$-stage coincidence circuit 24 and a $Z$-register 34. However, the conditions for counting and clearing the individual counters 10, 11, 12, 13 and 14 are not necessarily the same. The count and clear conditions for these counters are as follows.

| | | |
|---|---|---|
| Counter 10 | Count condition: | $Add \cdot \bar{n}_c \cdot \bar{Z}_c$ |
| | Clear condition: | $l_c \cdot Rl + R_E$ |
| Counter 11 | Count condition: | $l_c \cdot A_N$ |
| | Clear condition: | $N_c \cdot \bar{n}_c \cdot R_N + R_E$ |
| Counter 12 | Count condition: | $N_c \cdot A_n \cdot \bar{n}_c$ |
| | Clear condition: | $n_c \cdot R_n \cdot R_c + R_E$ |
| Counter 13 | Count condition: | $n_c \cdot Add \cdot \bar{Z}_c$ |
| | Clear condition: | $R_c \cdot R_R + R_E$ |
| Counter 14 | Count condition: | $R_c \cdot A_Z$ |
| | Clear condition: | $Z_c \cdot R_Z + R_E$, |

where Add indicates clock pulses produced in synchronism with the sampling period, $n_c$ a coincidence signal obtained from the $n$-stage coincidence circuit 22, $\bar{n}_c$ a signal equivalent to the inversion of the coincidence signal $n_c$, $Z_c$ a coincidence signal obtained from the Z-stage coincidence circuit 24, $\bar{Z}_c$ the inversion of the signal $Z_c$, $l_c$ a coincidence signal obtained from the $l$-stage coincidence circuit 20, $Rl$ a timing signal governing the clear operation of the $l$-stage counter 10, $R_E$ a clear signal which is produced upon completion of computation to clear the individual counters at a time, $A_N$ a timing signal governing a signal to increase the content of the N-stage counter 11 by one count, $N_c$ a coincidence signal obtained from the N-stage coincidence circuit 21, $R_N$ a timing signal governing the clear operation of the N-stage counter 11, $A_n$ a timing signal governing a signal to increase the content of the $n$-stage counter 12 by one count, $R_n$ a timing signal governing the clear operation of the n-stage counter 12, $R_c$ a coincidence signal obtained from the R-stage coincidence circuit 23, $A_Z$ a timing signal governing a signal to increase the content of the $Z$-stage counter 14 by one count, and $R_Z$ a timing signal governing the clear operation of the $Z$-stage counter. FIG. 19 shows the individual signals with the same time base.

Each of the registers 30, 31, . . ., 34 is set by a signal corresponding to the logical product of the common signal SEL and corresponding one of the set signals $S_l$, $S_N$, $S_n$, $S_R$ and $S_Z$ applied to the registers and has corresponding one of data $I_l$, $I_N$, $I_n$, $I_R$ and $I_Z$ set therein (the values for these data being 2, i.e. binary "10," as shown in FIG. 19). The data stored in the registers are reset by the common reset signal RAL. A register 35 serves to temporarily store the initial address $I_A$ in the memory, is set by $SEL \cdot R_A$ and reset by RAL.

Now, the actual operation of the circuit constitution described above is described in the following. Upon initiation of the operation, the registers 30, 31, . . ., 34 are respectively loaded with data $I_l$, $I_N$, $I_n$, $I_R$ and $I_Z$ by set command signals delivered from AND gates 300, 301, . . ., 304 gated by a signal SEL for determining frequency points and set signals $S_l$, $S_N$, $S_n$, $S_R$ and $S_Z$. At the same time, the counters 10, 11, . . ., 14 are all cleared by a clear signal $R_E$.

On the other hand, upon initiation of the operation, a clock signal Add is also generated in synchronism with the sampling period and applied to an AND gate 103 together with signals $\bar{n}_c$ and $\bar{Z}_c$. As seen in FIG. 19, at this stage, coincidence signals $\bar{n}_c$ and $\bar{Z}_c$ are not yet put out and therefore each of $n_c$ and $Z_c$ equals "1." Consequently, the clock signal Add is applied to the $l$-stage counter 10 through the gate 103 to cause the counter 10 to count "1." With the counted value "1," the coincidence circuit 20 cannot be enabled so that the circuit 20 cannot deliver its coincidence signal. When the next datum is sampled, the clock signal Add is applied from the gate to the counter 10 and the counter 10 counts "10" (=2). Immediately thereafter, the coincidence circuit 20 is enabled to deliver the coincidence signal $l_c$. The coincidence signal $l_c$ is continuously fed from the circuit 20 so far as the counter 10 holds the counted value "10" and the signal $l_c$ lasts until the counter 10 has been cleared. Since the coincidence signal $l_c$ is applied to AND gates 105 and 106, a logical product of the timing signal $R_l$ governing the clear operation of the register 10 and a timing signal $A_N$ governing a signal to drive the counter 11, is obtained. Each of the signals $R_l$ and $A_N$ has a single pulse within each sampling interval, but the phase of the pulse of the signal $R_l$ is different from that of the signal $A_N$, as seen from FIG. 19. The gate 106 is first opened by the combined effect of the coincidence signal $l_c$ and the signal $A_N$ so that the counter 11 counts "01." The gate 105 is then opened by the clear signal $R_l$ so that the counter 10 is cleared through an OR gate 104. Simultaneously with the clearing of the counter 10, the coincidence circuit 20 is disabled to change the coincidence signal $l_c$ from "1" to "0." Then, again in counter 10 is set "10" after a time equal to twice the sampling period, and the signal $A_N$ is sent to the counter 11 through the gate 106 so that the content of the counter 11 is "10." If the counter 11 counts "10," the coincidence circuit 21 is enabled by the combined effect of the signals from the counter 11 and from the register 31 to deliver the coincidence signal $N_c$. The coincidence signal $N_c$ clears the counter 11 through a gate 108 and causes the counter 12 to count "01" through a gate 109. Since the signal $n_c$ amoung those put into the gates 108 and 109 is "1," as seen in FIG. 19, the counting and clearing operations as described above are to be governed by the signals $R_N$ and $A_N$. When the counter 11 is cleared, the coincidence circuit 21 is disabled to change the coincidence signal $N_c$ from "1" to "0." In the like manner, when the counter 11 counts "10," the coincidence circuit 21 is enabled to produce the coincidence signal $N_c$ and the counter 12 counts "10." If "10" is set in the counter 12, the coincidence circuit 22 delivers the coincidence signal $n_c$. An AND gate 111 cannot be opened by the signal $n_c$ alone unless a coincidence signal $R_c$ appears from the coincidence circuit 23. Accordingly, no clear signal is applied to the counter 12 so that the counter 12 holds "10." The AND gate 109 associated with the counter 12 is closed since a signal $\bar{n}_c$, i.e., "0" is applied thereto. Therefore, the counter 12 holds "10" until the coincidence circuit 23 has delivered the coincidence signal $R_c$ and the counter 12 also holds the coincidence signal $n_c$ from the coincidence circuit 22.

Then, the clock signal Add controlled by a signal $\bar{Z}_c$ which is the negative of a coincidence signal $Z_c$ and by the coincidence signal $n_c$, is applied through an AND gate 100 to the counter 13 and the counter 13 counts "01." As described above, the counter 12 holds the coincidence signal $n_c$, and therefore the counter 13 will count "10" when the next clock signal Add arrives. Immediately the counter 13 has counted "10," the coincidence circuit 23 is enabled by the content "10" of the register 33 to deliver a coincidence signal $R_c$. Due to this signal $R_c$ the counter 12 is cleared with timing determined by a signal $R_n$ and a signal $A_n$ will be set in the counter 12 on the basis of the logic determined by the AND gate 109.

On the other hand, due to the coincidence signal $R_c$ from the coincidence circuit 23, signals $A_Z$ and $R_R$ are applied to the counters 14 and 13 through AND gates 114 and 113, respectively, so that the counter 13 is cleared while the counter 14 counts "01." At the time when the counter 14 has counted "01," the computation of block 1 is to be completed which consists of wave number $n$ and an ensuing constant rest period $R$. For the computation of the following block, a series of such similar operations as described above are sequentially performed. And finally, due to the coincidence signal $R_C$ from the coincidence circuit 23 the counter 14 counts "10" to cause the coincidence circuit 24 to deliver the coincidence signal $Z_c$. The counter 14 is cleared by the signal $R_Z$ through the AND gate 116 controlled by the coincidence signal $Z_c$. Here, the total computation of the block for $Z = 2$ is completed.

The above described operations are those concerned with the timing of the input signals. Now, an example of the allocation of the input signals to a memory on the basis of the timing will be described.

In FIG. 18, a memory section is constituted of an adder 40, a register 50, AND gates and OR gates. In particular, an AND gate 401 is one for deriving an output therefrom.

First, upon initiation of operation, a set signal $X_A$ is transferred through an AND gete 305 to a register 35 to cause the register 35 to store a datum $I_A$. The datum is then fed to an AND gate 406. The AND gate 406 is opened by a transfer command signal $T_{Bb}$ comming through an AND gate 410 and an OR gate 409 to transfer the datum $I_A$ to the register 50. Since a set signal $S_{Bb}$ is applied through an AND gate 404 to the register 50, the transferred datum $I_A$ is temporarily stored in the register 50.

Upon initiation of sampling following the start of operation, a series of data $d_1, d_2, d_3, d_4, \ldots, d_{18}, d_{19}, d_{20}$ as seen in FIG. 19 are sequentially taken in. Moreover, the content of the counter 11 shifts from one to another in response to the arrival of each of the data. The register 50 not only temporarily stores the content $I_A$ of the register 35 but also continuously delivers the content $I_A$ at its output terminal as long as it is stored in the register 50. The adder 40 makes a sum of the output signal $I_A$ from the register 50 and the content of the counter 11. In case where the data $d_1$ and $d_2$ are sampled, the counter 11 holds a counted value "00." In this case, therefore, the adder 40 delivers an output $I_A$. The datum $I_A$ is controlled by the AND gate 401 due to a control signal obtained from an AND gate 402. The input signals to the gate 402 are $\bar{n}_c$, $\bar{Z}_c$ and a read command signal Read. As is apparent from FIG. 19, $\bar{n}_c$ and $\bar{Z}_c$ are both "1," and if the read command signal Read is transferred simultaneously with the transfer of the datum $I_A$ from the adder 40, the signal Read is passed through the gate 402 to cause the gate 401 to put out the datum $I_A$. The output datum $I_A$, though not shown, is then transferred to a register such as an address register in which an address is stored.

On the other hand, the output signal $I_A$ of the adder 40 is fed to an AND gate 405. However, since the coincidence signal $R_c$ of the coincidence circuit 23 is appled as a control signal to the AND gate 405 which signal $R_c$ can be "1" only for the last datum of the block 1, the AND gate 405 is not opened so that the datum $I_A$ is still stored in the register 50.

After $d_2$ has been sampled, the counter 11 counts "01," as seen in FIG. 19. Consequently, in the stage that the datum $d_3$ is put in, the output signal of the adder 40 is $I_A + 1$. This datum $I_A + 1$ is being fed through the AND gate 401 to an external register. The datum $I_A + 1$ continued to be fed to the register until the datum $d_4$ has been sampled.

Then, upon completion of the sampling of the datum $d_4$, the counter 11 counts "10," but no datum will be sampled for the counted value "10," as seen in FIG. 19. When the counter 11 is cleared, the content of the counter 11 will be "00," and consequently the adder 40 delivers $I_A$ again and the output $I_A$ is fed through the AND gate 401 to the external register. The data corresponding to this address $I_A$ are $d_5$ and $d_6$. In like manner, an adress $I_A + 1$ corresponds to $d_7$ and $d_8$.

Immediately datum $d_8$ is sampled, the content of the counter 11 becomes "10," and this condition is held while data $d_9$ and $d_{10}$ are sampled, as is apparent from FIG. 19. Therefore, the adder 40 continuously delivers a signal $I_A + 2$ all this while. On the other hand, the signals $\bar{n}_c$ and $\bar{Z}_c$, among the control signals to the AND gate 402, assume a value "0" while the coincidence signal $n_c$ is "1," as seen in FIG. 19, so that both the AND gate 402 and 401 are closed. The AND gate 405 is opened while the coincidence signal $R_c$ is "1," and while the gate 405 is opened, the set signal $R_R$ is fed through the gate 114 to the register 50, which is actuated to set the datum $I_A + 2$ therein. The datum $I_A + 2$ set in the register 50 is not set in the external register since the gate 401 is closed while $N = 2$, as described above, so that an output signal having an address "0" is derived from the gate 401. By using the address "0" as a location for accommodating undesired data, the data $d_9$ and $d_{10}$ may be stored in the address "0" obtained from the AND gate 401. In this way, no data are taken in, that is, there is a rest, for $d_9$ and $d_{10}$. Thus, all the data constituting block 1 have been taken in.

Next, there is described a procedure in which all the data constituting block 2 are taken in. In this case, the datum $I_A + 2$ stored previously in the register 50 is used. Namely, the explanation of the details of this procedure overlaps that described above of the block 1 and is, therefore, omitted. However, only the result is given in the following. Namely, address $I_A + 2$ is chosen in sampling of data $d_{11}$ and $d_{12}$, address $I_A + 3$ in sampling of $d_{13}$ and $d_{14}$, address $I_A + 2$ in sampling $d_{15}$ and $d_{16}$, and address $I_A + 3$ in sampling of $d_{17}$ and $d_{18}$. In this way, all the addresses corresponding to the desired input data can be determined.

As has been already described, the address data taken out of the AND gate 401 are fed to, for example, an address register in a memory and used as indication addresses. On the other hand, the input data $d_1, d_2, \ldots$ sent corresponding to the indication addresses are added up appropriately by an adder provided in front of the data register of the memory, and the outputs of the adder are sequentially stored through the data register in the addresses indicated by the address register. In the present embodiment, the correspondence between data and addresses are as follows.

Figure 20:
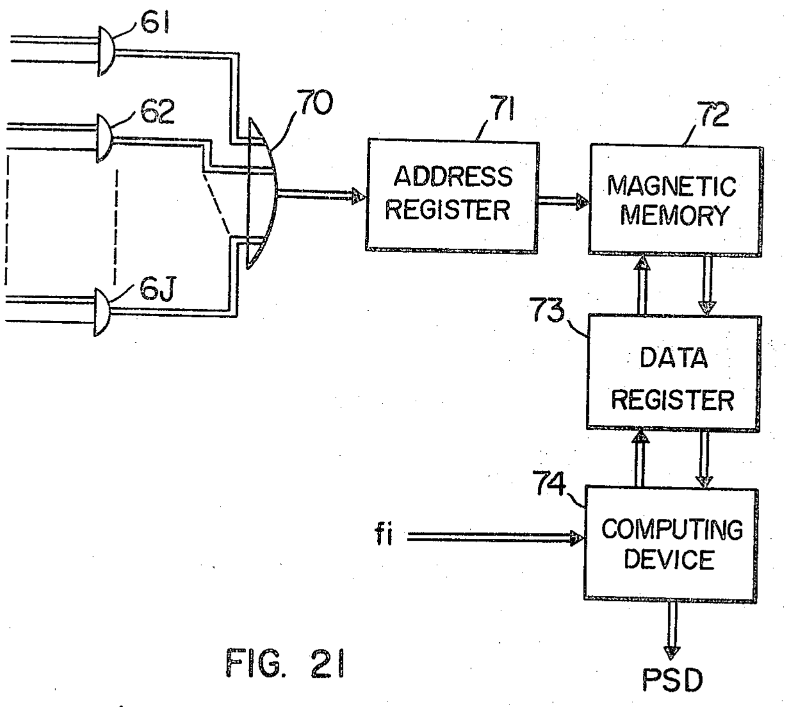
FIG. 20 is a diagram, shown in block form, of a system adapted to obtain a power spectrum density.

Adress $I_A \ldots d_1 + d_2 + d_5 + d_6$
Address $I_A + 1 \ldots d_3 + d_4 + d_7 + d_8$
Address $I_A + 2 \ldots d_{11} + d_{12} + d_{15} + d_{16}$
Address $I_A + 3 \ldots d_{13} + d_{14} + d_{17} + d_{18}$ With this distribution of data to addresses, the data necessary for computing power spectrum density are to be stored in the addresses $I_A$ to $I_A + 3$. The abovementioned data are read out of the memory respectively in accordance with sine or cosine wave. It should here be noted that the true power spectrum density is the value obtained by striking a mean between a power spectrum density derived from the data in the addresses $I_A$ and $I_A + 1$ and that derived from the data in the addresses $I_A + 2$ and $I_A + 3$. A device which can, as described above, distribute the data to the memory and derive the power spectrum density from the distributed data, can be realized in a manner similar to that in which any of the previously described computing devices is fabricated. For example, a constitution for computation in case that a memory is used, is shown in FIG. 20. In this constitution, a coincidence circuit is employed for the discrimination of whether the contents of various counters have reached the corresponding predetermined values or not. Otherwise, a complement circuit may be used, which is so designed as to sequentially receive the pulses to be counted and indicate the predetermined values when it has reached 0. The above description is especially applicable to the case where $l = 2$, $N = 2$, $n = 2$, $R = 2$ and $Z = 2$. For other conditions, it is only necessary to set in the registers 30 to 34 the date suitable to the conditions. Namely, according to the present embodiment, by merely setting predetermined data in the registers 30 to 34, the frequency points can be shifted, the accuracy of resolution can be freely determined, and the averaging operation can at will be changed. Therefore, a variety of embodiments are made possible, and this is the most remarkable feature of this embodiment as well as the ground for the simplicity of the device in comparison with those in the several embodiments described above.

Figure 21:
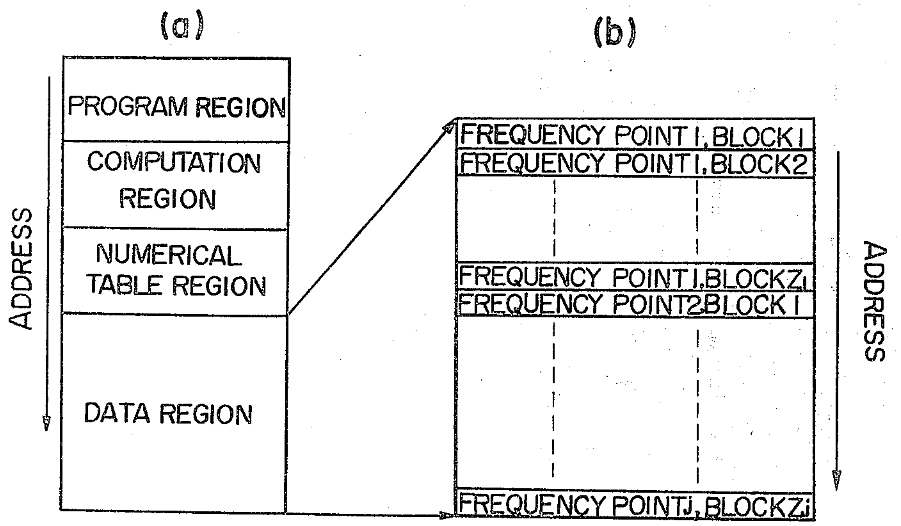
FIG. 21 shows the contents of the memory region in the memory shown in FIG. 20.

FIG. 20 shows a constitution adapted to obtain a power spectrum density most suitable to the embodiment shown in FIG. 18. AND gates 61, 62, . . ., 6J correspond to the AND gate 401 for address output shown in FIG. 18, and accordingly in this embodiment, power spectrum density is computed at J frequency points. Reference numerals 71, 72, 73 and 74 designate an address register, a magnetic memory, a data register and a computing device, respectively. In this constitution, the addresses corresponding to frequency points are fed to the register 71 by sequentially opening the gates 61, 62, . . ., 6J. The contents in the addresses specified by the register 71 are read by the register 73, and the read contents are added in the computing device 74 to an input signal and again written through the register 73 in the addresses specified by the register 71. After all the data have been taken in, the computation of the power spectrum density is performed. Data necessary for the computation of power spectrum are, for example, as shown in FIG. 21. The portion (*a*) of FIG. 21 shows the memory constitution of data stored in the memory 72. The constitution consists of program, kinds of computation, representation of trigonometric functions and data taken in by a process similar to those shown in FIGS. 18 and 20.

The portion (b) of FIG. 21 shows the constitution of the input data. The input data correspond to the frequency points whose number is $j$, and are stored in correspondence with the number of blocks obtained at the frequency points. Thus, according to the constitution as shown in the portions (*a*) and *b* of FIG. 21, the computation of power spectrum density as shown in FIG. 20 can be easily performed.

In the foregoing, the case where ${}_lS_k$ is expressed by the equation (2) has been described. However, $h(k, l, i)$ also has other values than that given by the equation (1-3). For example, if it is assumed that $$h(k, l, i) = \begin{cases} 1 \ldots i = lk \\ 0 \ldots i \neq lk \end{cases} \qquad (26)$$

$$(k = 0, 1, 2, \ldots),$$

the corresponding ${}_lSk$ is such that $${}_lS_k = f_{lk} \qquad (26).$$

According to this formula, $f_1$ is taken out every $l$th data and provided with subscript $k$ which takes values 0, 1, 2, . . 0, etc. Hence, ${}_lS_{k\ k}$ is one of $f_i$'s, number is $l$, between the period $l\tau$.

The equation $$\left.\begin{array}{l} lk \leqq i \leqq l\ (k + ½) - 1 \\ -i + l(k+1) \ldots l(k + ½) \leqq i \leqq l(k+1) - 1 \\ 0 \ldots i < lk, \text{ or } i \geqq l\ (k+1) \end{array}\right\} - \qquad (27)$$

is also available. In this case ${}_lS_k$ is such that $$S_k = \left(\frac{2}{l}\right)^2 \left[ \sum_{i=lk}^{l(k+1/2)-1} (i - lk) f_i + \sum_{i=l(k+1/2)}^{l(k+1)-1} \{(k+1)l - i\} f_i \right] \qquad (28)$$

Thus, various ${}_lS_k$'s are derived depending upon the weight functions $h(k, l, i)$ to be multiplied, and the filter characteristics of the ${}_lS_k$'s become proper to the weight functions. Only the common factor is that the data $f_i$ taken in every period $\tau$ is changed to the data ${}_lS_k$ with a period $l\tau$. The embodiment shown in FIG. 18 is also applicable in case where ${}_lS_k$ can be expressed by the equation (26) or (28). However, in case of the equation (26), all the $f_i$'s which are sampled, are not added to the addresses specified by the device shown in FIG. 18, but only some of them appearing every $l$th pulse are added. In case where ${}_lS_k$ according to the equation (28)

is used, it is necessary to add to the addresses specified by the device shown in FIG. 18 $f_i$'s multiplied by $(i-lk)$ or $(k+1)l-i$.

In the foregoing the embodiment as well as the principle of the present invention have been described, and it is considered that the present invention has merits that frequency points can be arbitrarily chosen by appropriately setting the length $l$ of data and the width $N$ of meshes, especially the length $l$, that the resolution can be arbitrarily chosen by appropriately selecting the wave number $n$, and that the statistical accuracy can be improved by introducing the concept of data block. Further, according to the present invention, the real time allocation of the data as seen in Tables 1 and 2 is possible and the computation time of the data after such allocation, since the computation is based on a simple operation, can be very short. Moreover, according to the embodiment of the invention as shown in FIG. 18, since it is only necessary for the address capacity of the memory to have $N$ meshes at every analytical point, the device will have an advantage that its capacity can be much smaller than that of any similar device such as FFT. Consequently, a simpler table of trigonometric function can be used. In conclusion, according to the present invention, frequency analysis can be achieved with a circuit configuration which is by far simpler than that associated with any like process such as FFt.

We claim:

1. A frequency analyzer for analyzing as a function of time a selected quantity comprising:

means for counting clock signals;

means for sampling under control of said clock signals, a signal to be analyzed and for converting the sampled data into a digitized signal;

means for decoding the sequence numbers of the mesh points in the individual divisions of a sine wave in response to the data derived from said counting means;

gate means for selectively passing said digitized signal to respective outputs in response to the signal decoded by said decoding means;

adder/subtractor means for selectively performing addition or subtraction on successive signals received from the respective outputs of said gate means depending of the value of the data derived from said counting means;

means for generating a plurality of trigonometric function values;

means for multiplying said respective trigonometric function values by the respective output values of said adder/subtractor means; and means for summing up all the respective outputs derived from said multiplier means.

2. A frequency anylzer according to claim 1, further comprising signal distributor means provided between the adder/subtractor means and said multiplier means for obtaining coefficient values for said respective trigonometric function values.

3. A frequency analyzer comprising:

means for sampling a signal to be analyzed as a function of time in synchronism with clock signals having a period $\tau$ and for converting the sampled value to a digitized signal;

first counter means for counting said clock signals so as to produce a first overflow signal whenever said first counter has counted $l$ times, where $l$ is an integer;

said second counter means for counting said first overflow signal so as to produce a second overflow signal where said second counter has counted $N$ times, where $N$ is an integer;

third counter means for counting said second overflow signal so as to produce a third overflow signal whenever said third counter has counted $n$ times, where $n$ is an integer;

$N$ integrating means each including a memory for integrating said digitized signal;

means for applying said digitized signal to a specified one of said $N$ integrating means, according to the contents of said second counter means, to integrate said digitized signal successively until said third overflow signal is produced;

means for multiplying the contents stored in said memories of said integrating means for function values of sine and cosine waves so as to perform a frequency analysis for an annular frequency $\omega$ which is represented by the value $2\pi u/Nl\tau$, where $N$, $l$, and $u$ are positive integers.

4. A frequency analyzer according to claim 3 wherein, when $N$ is an even number, the most significant bit of said second counter is separated to represent the relative address $N/2$ words by the remaining bit of said second counter, whereby it is alternatively selectable whether said digitized sampled value is added to or subtracted from the contents of said relative address according to whether said most significant bit is 1 or 0.

5. A frequency analyzer comprising:

means for sampling a signal to be analyzed as a function of time at intervals of $\tau$ under control of clock signals having a period $\tau$ and for converting the sampled value to a digitized signal;

first counter means for counting said clock signals so as to produce a first overflow signal whenever said first counter has counted $l$ times, where $l$ is an integer;

second counter means for counting said first overflow signal so as to produce a second overflow signal whenever said second counter has counted $N$ times, where $N$ is an integer;

third counter means for counting said second overflow signal so as to produce a third overflow signal whenever said counter has counted $n$ times, where $n$ is an integer;

address computing means for adding a value representing an address of an electronic computer to the value of the contents of said second counter;

means for effecting correspondence between the contents of said second counter and a relative address of $N$ words in said electronic computer by adding a digitized sampled value to the contents of said relative address every sampling period successively until said third overflow signal is produced;

means for multiplying the contents stored in said relative address of said electronic computer by function values of sine and cosine waves so as to perform the frequency analysis for an angular frequency $\omega$ which is represented by the value $2\pi u/Nl\tau$ where $N$, $l$, and $u$ are positive integers.

* * * * *